(12) United States Patent
Waller et al.

(10) Patent No.: US 11,111,429 B2
(45) Date of Patent: Sep. 7, 2021

(54) COMPOSITIONS AND METHODS FOR DELAYED CROSSLINKING IN HYDRAULIC FRACTURING FLUIDS

(71) Applicant: ChampionX USA Inc., Sugarland, TX (US)

(72) Inventors: Christopher Waller, Houston, TX (US); Kirk E. Wells, Sugar Land, TX (US); Brian Mueller, Sugar Land, TX (US); Trinh Tran, Manvel, TX (US); Pablo Munoz, Katy, TX (US)

(73) Assignee: ChampionX USA Inc., Sugarland, TX (US)

( * ) Notice: Subject to any disclaimer, the term of this patent is extended or adjusted under 35 U.S.C. 154(b) by 164 days.

(21) Appl. No.: 16/555,087

(22) Filed: Aug. 29, 2019

(65) Prior Publication Data

US 2020/0063021 A1 Feb. 27, 2020

Related U.S. Application Data

(62) Division of application No. 15/225,879, filed on Aug. 2, 2016, now abandoned.
(Continued)

(51) Int. Cl.
*C09K 8/68* (2006.01)
*C09K 8/90* (2006.01)
*C09K 8/88* (2006.01)

(52) U.S. Cl.
CPC ............... *C09K 8/685* (2013.01); *C09K 8/68* (2013.01); *C09K 8/887* (2013.01); *C09K 8/90* (2013.01)

(58) Field of Classification Search
CPC ............ C09K 2208/12; C09K 2208/26; C09K 8/528; C09K 8/602; C09K 8/605;
(Continued)

(56) References Cited

U.S. PATENT DOCUMENTS 3,058,909 A 10/1962 Kern
3,301,723 A 1/1967 Chrisp
(Continued)

FOREIGN PATENT DOCUMENTS

AU 704257 B2 3/1996
AU 3053295 A 3/1996
(Continued)

OTHER PUBLICATIONS

International Search Report dated Sep. 12, 2016 for International Application No. PCT/US2016045169, 4 pages.
(Continued)

*Primary Examiner* — Alicia Bland
(74) *Attorney, Agent, or Firm* — Kagan Binder, PLLC

(57) ABSTRACT

Disclosed herein are compositions and methods for delaying crosslinking in injectable compositions for hydraulic fracturing and related applications. The compositions and methods are effective in injectable compositions comprising or substantially excluding dissolved reactive species. The compositions and methods provide delayed crosslinking at high temperatures and pressures, such as those encountered by hydraulic fracturing compositions injected into subterranean environments. Compositions include injectable solutions comprising a competing agent that is the reaction product of a dialdehyde having 2 to 4 carbon atoms with a non-polymeric cis-hydroxyl compound. Also provided are methods of making and using delayed-crosslinking compositions comprising crosslinker compositions containing zirconium complexes and the competing agents.

8 Claims, 3 Drawing Sheets

Related U.S. Application Data

(60) Provisional application No. 62/200,172, filed on Aug. 3, 2015, provisional application No. 62/362,691, filed on Jul. 15, 2016.

(58) Field of Classification Search
CPC .......... C09K 8/685; C09K 8/887; C09K 8/90; E21B 33/138; E21B 37/06
See application file for complete search history.

(56) References Cited

U.S. PATENT DOCUMENTS

| | | |
|---|---|---|
| 4,477,360 A | 10/1984 | Almond |
| 4,534,870 A | 8/1985 | Williams |
| 4,537,634 A | 8/1985 | Floyd |
| 4,553,601 A | 11/1985 | Almond et al. |
| 4,578,488 A | 3/1986 | Rummo et al. |
| 4,619,776 A | 10/1986 | Mondshine |
| 4,683,068 A | 7/1987 | Kucera |
| 4,686,052 A | 8/1987 | Baranet et al. |
| 4,702,848 A | 10/1987 | Payne |
| 4,798,902 A | 1/1989 | Putzig |
| 5,082,579 A | 1/1992 | Dawson |
| 5,145,590 A | 9/1992 | Dawson |
| 5,160,643 A * | 11/1992 | Dawson .............. C08B 37/0087 166/308.5 |
| 5,165,479 A | 11/1992 | Harris et al. |
| 5,217,632 A | 6/1993 | Sharif |
| 5,226,481 A | 7/1993 | Le et al. |
| 5,305,832 A | 4/1994 | Gupta et al. |
| 5,335,733 A | 8/1994 | Sandiford et al. |
| 5,488,083 A | 1/1996 | Kinsey, III et al. |
| 5,559,082 A | 9/1996 | Sanner et al. |
| 5,565,513 A | 10/1996 | Kinsey, III et al. |
| 5,658,861 A | 8/1997 | Nelson et al. |
| 5,773,638 A | 6/1998 | Dawson et al. |
| 5,789,350 A | 8/1998 | Moradi-Araghi et al. |
| 5,877,127 A | 3/1999 | Card et al. |
| 5,950,729 A | 9/1999 | Dawson et al. |
| 5,972,850 A | 10/1999 | Nimerick |
| 6,060,436 A | 5/2000 | Snyder et al. |
| 6,138,760 A | 10/2000 | Lopez et al. |
| 6,177,385 B1 | 1/2001 | Nimerick |
| 6,302,209 B1 | 10/2001 | Thompson, Sr. et al. |
| 6,310,008 B1 | 10/2001 | Rietjens |
| 6,316,506 B2 | 11/2001 | Asgharian |
| 6,403,609 B1 | 6/2002 | Asgharian |
| 6,486,215 B2 | 11/2002 | Asgharian |
| 6,495,608 B1 | 12/2002 | Asgharian |
| 6,583,124 B2 | 6/2003 | Asgharian |
| 6,617,285 B2 | 9/2003 | Crews |
| 6,719,053 B2 | 4/2004 | Thompson |
| 6,838,449 B2 | 1/2005 | Asgharian |
| 6,849,581 B1 | 2/2005 | Thompson et al. |
| 7,084,093 B2 | 8/2006 | Crews |
| 7,084,096 B2 | 8/2006 | Harris, Jr. et al. |
| 7,160,842 B2 | 1/2007 | Crews |
| 7,169,767 B2 | 1/2007 | Asgharian |
| 7,268,100 B2 | 9/2007 | Kippie et al. |
| 7,396,924 B2 | 7/2008 | Rinaldi et al. |
| 7,565,933 B2 | 7/2009 | Kippie et al. |
| 7,566,686 B2 | 7/2009 | Kippie et al. |
| 7,595,391 B2 | 9/2009 | Norman et al. |
| 7,712,535 B2 | 5/2010 | Venditto et al. |
| 7,732,382 B2 | 6/2010 | Putzig |
| 7,732,383 B2 | 6/2010 | Putzig |
| 7,754,660 B2 | 7/2010 | Putzig |
| 7,795,187 B2 | 9/2010 | Putzig |
| 7,795,188 B2 | 9/2010 | Putzig |
| 7,795,190 B2 | 9/2010 | Putzig |
| 7,851,417 B2 | 12/2010 | Putzig |
| 7,886,824 B2 | 2/2011 | Kakadjian et al. |
| 7,921,046 B2 | 4/2011 | Parsons et al. |
| 7,932,214 B2 | 4/2011 | Zamora et al. |
| 7,942,201 B2 | 5/2011 | Ekstrand et al. |
| 7,956,217 B2 | 6/2011 | Falana et al. |
| 7,968,501 B2 | 6/2011 | Parris |
| 7,972,998 B2 | 7/2011 | Dessinges et al. |
| 7,989,404 B2 | 8/2011 | Kakadjian et al. |
| 7,992,653 B2 | 8/2011 | Zamora et al. |
| 8,003,578 B2 | 8/2011 | Monroe et al. |
| 8,011,431 B2 | 9/2011 | van Petegem et al. |
| 8,030,250 B2 | 10/2011 | Sun et al. |
| 8,034,750 B2 | 10/2011 | Thompson et al. |
| 8,053,468 B2 | 11/2011 | Selifonov |
| 8,065,905 B2 | 11/2011 | Sweeney et al. |
| 8,084,401 B2 | 12/2011 | Lukocs et al. |
| 8,093,431 B2 | 1/2012 | Falana et al. |
| 8,141,661 B2 | 3/2012 | Kakadjian et al. |
| 8,158,562 B2 | 4/2012 | Wilson, Jr. et al. |
| 8,172,952 B2 | 5/2012 | Wanner et al. |
| 8,173,580 B2 | 5/2012 | De Benedictis et al. |
| 8,273,693 B2 | 9/2012 | Schwartz |
| 8,287,640 B2 | 10/2012 | Zamora et al. |
| 8,362,298 B2 | 1/2013 | Falana et al. |
| 8,371,383 B2 | 2/2013 | Bell et al. |
| 8,450,252 B2 | 5/2013 | Funkhouser et al. |
| 8,466,094 B2 | 6/2013 | Kakadjian et al. |
| 8,505,362 B2 | 8/2013 | Sweeney et al. |
| 8,507,412 B2 | 8/2013 | Lukocs et al. |
| 8,507,413 B2 | 8/2013 | Wilson, Jr. |
| 8,524,639 B2 | 9/2013 | Falana et al. |
| 8,539,821 B2 | 9/2013 | Sweeney et al. |
| 8,546,519 B2 | 10/2013 | Selifonov et al. |
| 8,596,911 B2 | 12/2013 | Curr et al. |
| 8,636,066 B2 | 1/2014 | Gupta et al. |
| 8,673,826 B2 | 3/2014 | Dessinges et al. |
| 8,728,989 B2 | 5/2014 | Kakadjian, Sr. et al. |
| 8,746,044 B2 | 6/2014 | Curr et al. |
| 8,835,364 B2 | 9/2014 | Thompson et al. |
| 8,841,240 B2 | 9/2014 | Kakadjian et al. |
| 8,846,585 B2 | 9/2014 | Falana et al. |
| 8,851,174 B2 | 10/2014 | Zamora et al. |
| 8,871,694 B2 | 10/2014 | Kakadjian et al. |
| 8,895,480 B2 | 11/2014 | Dawson et al. |
| 8,899,328 B2 | 12/2014 | Zamora et al. |
| 8,921,597 B2 | 12/2014 | Sun et al. |
| 8,932,996 B2 | 1/2015 | Falana et al. |
| 9,062,242 B2 | 6/2015 | Jiang et al. |
| 9,181,469 B2 | 11/2015 | Dobson, Jr. et al. |
| 2007/0187101 A1 | 8/2007 | Putzig |
| 2007/0187642 A1* | 8/2007 | Putzig ................... C09K 8/512 252/182.13 |
| 2008/0149333 A1 | 6/2008 | Putzig |
| 2008/0227667 A1 | 9/2008 | Szymanski et al. |
| 2008/0236824 A1 | 10/2008 | Putzig |
| 2009/0149354 A1 | 6/2009 | Dajani et al. |
| 2011/0030962 A1 | 2/2011 | Parris |
| 2012/0152544 A1 | 6/2012 | Parris et al. |
| 2012/0157560 A1 | 6/2012 | Selifonov et al. |
| 2014/0209304 A1 | 7/2014 | Reed et al. |
| 2015/0094239 A1 | 4/2015 | Harry et al. |
| 2015/0284623 A1* | 10/2015 | Schwab .................. C09K 8/90 507/211 |

FOREIGN PATENT DOCUMENTS

| | | |
|---|---|---|
| CN | 101993688 A | 3/2011 |
| CN | 102634329 A | 8/2012 |
| CN | 104559995 A | 4/2015 |
| EA | 0528461 B1 | 2/1993 |
| EP | 0528461 A2 | 2/1993 |
| EP | 0528461 B2 | 2/1993 |
| EP | 0805260 A2 | 11/1997 |
| EP | 0805260 B1 | 11/1997 |
| EP | 0970175 B1 | 1/2000 |
| EP | 0999825 B1 | 5/2000 |
| EP | 0999854 B1 | 5/2000 |
| EP | 1092835 A1 | 4/2001 |
| EP | 1203808 A1 | 5/2002 |
| EP | 1203808 B1 | 5/2002 |
| EP | 1348427 A1 | 10/2003 |
| EP | 1490408 B1 | 12/2004 |
| GB | 2254636 A | 10/1992 |

(56) References Cited

FOREIGN PATENT DOCUMENTS

| | | | |
|---|---|---|---|
| GB | 2291907 | A | 2/1996 |
| GB | 2383597 | A | 7/2003 |
| GB | 2383597 | B | 7/2003 |
| WO | 99/06023 | A1 | 2/1999 |
| WO | 99/06070 | A1 | 2/1999 |
| WO | 99/06512 | A1 | 2/1999 |
| WO | 03/001030 | A1 | 1/2003 |
| WO | 03/078473 | | 9/2003 |
| WO | 2006/095291 | A1 | 9/2006 |

OTHER PUBLICATIONS

Written Opinion dated Sep. 12, 2016 for International Application No. PCT/US2016045169, 5 pages.
BASF Corporation, The Chemical Company, Technical Bulletin Quadrol® Polyol, 2004, 1 page.
Dorf Ketal Specialty Catalysts, LLC, Organic Zirconate, TYZOR® NPZ, 2011, 2 pages.
Aqualon, Guar and Guar Derivatives Oil and Gas Field Applications Brochure, 2007, 44 pages.
Doudoroff, et al., "Arsenolysis and Phosphorolysis of the Amy-lose and Amylopectin Fractions of Starch," Nature, vol. 161, p. 96, (1948).
Mendham et al., Vogel's Textbook of Quantitative Chemical Analysis, Sixth Edition, 14 pages, (2000).
Sigma-Aldrich, Product No. 515833—Tetrakis(triethanolaminato)zirconium(IV), Sigma-Aldrich, 515833—Tetrakis (triethanolaminato) zirconium (IV) retrieved from http://www.sigmaaldrich.com/catalog/product/aldrich/515833?lang=en&region=US, on Apr. 15, 2016, 3 pages.
H. Deuel et al, "Reaction of boric acid with polysaccharides", Nature, vol. 161, Issue 4081, Jan. 17, 1948, pp. 96-97.
Peztsky et al., "Reaction of Glyoxal With Boric Acid and Borate Ion", Tetrahedron, vol. 25, pp. 4137-4145, 1969.

\* cited by examiner

COMPOSITIONS AND METHODS FOR DELAYED CROSSLINKING IN HYDRAULIC FRACTURING FLUIDS

CROSS-REFERENCE TO RELATED APPLICATION

This application is a divisional application of U.S. Application No. 15/225,879, filed on Aug. 2, 2016, which claims the benefit under 35 U.S.C. §119(e) of U.S. Provisional Patent Application No. 62/200,172, filed on Aug. 3, 2015 and titled "Compositions and Methods for Delayed Crosslinking in Hydraulic Fracturing Fluids," and also claims the benefit under 35 U.S.C. §119(e) of U.S. Provisional Patent Application No. 62/362,691, filed Jul. 15, 2016 which is titled" Method of Delaying Crosslinking in Produced Waters," which is incorporated herein by reference in their entireties.

TECHNICAL FIELD

The present invention relates to compositions and methods for delaying crosslinking of polymers effected by a variety of complexes in water.

BACKGROUND

Hydraulic fracturing is a well-stimulation technique in which subterranean rock is fractured by a hydraulically pressurized fracturing fluid typically made by combining water or an aqueous liquid, a hydraulic fracturing proppant (conventionally sand or aluminum oxide), and additive chemicals that modify subterranean flow, subterranean interfacial tension, and/or provide other effects. A hydraulic fracture is formed by pumping the fracturing fluid into a wellbore at a rate sufficient to increase pressure at the target depth to exceed that of the fracture gradient (pressure gradient) of the rock. When the hydraulic pressure is removed from the well, the hydraulic fracturing proppants lodge within the cracks to hold the fractures open. Hydrocarbon compounds such as natural gas and petroleum are recovered via the cracks in the hydrocarbon-containing deep-rock formations. Hydraulic fracturing techniques can be used to form a new well and can also be used to extend the life of an existing conventional oil well.

In recent years the hydraulic fracturing industry has turned to recycling the water that flows back from the subterranean formations after release of hydraulic pressure thereto. Such water is referred to as "produced water." Produced water is often characterized as having high total dissolved solids, such as at least about 1 wt % total dissolved solids and as much as about 35 wt % total dissolved solids, in addition to any residual fracturing fluid chemicals flowing back from the injection thereof. Stated differently, the dissolved solids in produced water are derived principally from the subterranean reservoir itself. In most cases, a substantial portion of the dissolved solids are ionic (one or more salts). Rather than treat the produced water to remove dissolved solids, it is economically more practical to simply use the produced water with no further treatment prior to use as a fracturing liquid.

Chemical additives including surfactants and polymers have been added to fracturing fluids in hydraulic fracturing processes to increase recovery of hydrocarbon compounds from subterranean hydrocarbon-containing formations by controlling interfacial energy of the fluid with the subterranean features such as various rock types, to control friction caused by the fracturing fluid as it flows within the subterranean formation and through narrow tubulars, to control viscosity of the fracturing fluid, or two or more thereof. For example, the use of polysaccharides such as guar gum, coupled with boron-containing compounds as crosslinking agents therefor is a well-known art for controlling viscosity as described, for example, in U.S. Pat. No. 3,058,909.

As injected into a subterranean formation, fracturing fluids typically contain less than about 1 wt % total added materials such as polymers, crosslinkers, surfactants, and the like. But manufacturing, transporting, and storing a 1 wt % aqueous solution is simply impractical. Thus, fracturing fluid compositions are manufactured and delivered as the dry components thereof or as concentrates of greater than 1 wt % total solids, for example at least about 20 wt % solids and often higher, for dilution at the work site using standard dilution equipment. In some embodiments, due to lack of space in the field or for economic efficiency, the polymers and crosslinkers are provided in dry form and are added to water in the field just prior to injection.

In order to carry the proppant particles used to keep the cracks in the subsurface formation open once they are fractured, fracturing fluids need to be able to carry these particles all the way down and into these cracks. One way of doing this is to increase the viscosity of the fracturing fluid. Crosslinking provides one means by which the viscosity of fracturing fluids can be increased.

A problem encountered during hydraulic fracturing is the loss of fluid injectivity in areas of relatively low permeability due to preferential flow of the fracturing fluid into higher permeability areas, sometimes known as "channeling". Oil bearing strata are usually heterogeneous, some parts of them being more permeable than others. As a consequence, channeling can occur so that the driving fluid flows preferentially through permeable zone depleted of oil (so-called "thief zones") rather than through those parts of the strata that contain sufficient oil to make oil-recovery operations profitable. Difficulties in oil recovery due to high permeability of zones may be corrected by injecting an aqueous solution of an organic polymer and a crosslinking agent into certain subterranean formations where the polymer will be crosslinked to produce a gel, thus reducing the permeability of such subterranean formations to driving fluid (gas, water, etc.).

Crosslinked fluids or gels are now being used in wells under a variety of temperature and pH conditions. Polysaccharide or partially hydrolyzed polyacrylamide-based fluids crosslinked with certain aluminum, titanium, zirconium, and boron-based compounds are used in enhanced oil recovery operations. Such fracturing fluids can encounter a variety of conditions of high temperature and pressure in subterranean formations.

A disadvantage with many of the known crosslinkers is that they can cause an immediate and excessive increase in viscosity of the fracturing fluids to which they are added. Excessive viscosity increase before the fracturing fluid has sufficiently penetrated the subterranean formation increases strain on pumping equipment and/or requires greater energy consumption to pump the fracturing fluids into the subterranean formations. Excessive fracturing fluid viscosity can also increase shear in the pumping equipment, causing degradation of components within the fracturing fluid and leading to degradation in fracturing fluid performance.

A further issue encountered is that produced waters can contain dissolved reactive species such as boric acid and/or borate oxyanions, which can function as crosslinkers for polysaccharides and cause premature crosslinking of hydraulic fracturing fluids comprising polysaccharides and produced waters. When the fracturing fluid concentrate contains a polysaccharide and a crosslinking compound intended for providing a crosslinked polysaccharide, it is normally desirable to prevent extraneous boron compounds from inclusion in the fracturing fluid during and after the injection into a subterranean formation. The viscosity of the fracturing fluid is highly sensitive to both pH and borate concentration. U.S. Pat. No. 5,877,127 further states that "the concentration of borate ion must be controlled within a very narrow window" in order to have a viable fluid for hydraulic fracturing applications. Maintaining control of borate concentration is not difficult if substantially boron-free water sources are employed for the dilution of concentrate to fracturing fluid.

Borate-mediated ionic crosslinking is known to be highly sensitive to both pH and borate concentration. Borate mediated crosslinking is enabled by the use of boric acid ($B(OH)_3$, or tetrahydroxyborate when in aqueous solution), or another boron-containing compound capable of forming orthoborate ($B(OH)_4^-$) or another boron-containing oxyanion structure, collectively referred to herein as "borates". At pH of above about 9.5 suitable boron containing compounds exist substantially as borate species. The boric acid-borate equilibrium, however, provides for some borate oxyanion species to be present at pH at or above about 6.5.

It is known that borate anion reacts with polyhydroxylated compounds (compounds having at least two hydroxyl moieties) having at least one pair of hydroxyl groups situated in a 1,2 configuration, further wherein the hydroxyls are configured to allow the coordination thereof with a borate anion. For example, borate oxyanions are capable of reacting with one or two cis-hydroxyl pairs to form an ionic complex or a coordination complex. Notably, the pKa of boric acid is reported to be 8.98, while in the presence of some cis-hydroxyl compounds (including glycerol, mannose, and sorbitol) the pKa is about 4. (Mendham, J.; Denney, R. C.; Barnes, J. D.; Thomas, M. J. K. (2000), Vogel's Quantitative Chemical Analysis (6th ed.), New York: Prentice Hall, p. 357.) Thus, crosslinking of certain cis-hydroxylated polymers, such as polysaccharides, is suitably accomplished using pH to control crosslinking. Conventionally, pH in such systems is adjusted to at least about 8.5, in some cases above 9, to trigger rapid crosslinking; however, some crosslinking will occur at lower pH, for example as low as about 6.5. In practical terms, the crosslinking reaction is very rapid or even instantaneous in solution.

However, produced water often contains dissolved reactive boron species, present as boric acid and/or borate oxyanions. The concentration of elemental boron dissolved in produced water varies according to geographic location. Often, between 10 ppm and 500 ppm of elemental boron is measured in produced water, or more commonly about 20 ppm to 150 ppm. For example, 40 ppm elemental boron (3.70 mmol/L) corresponds to 229 ppm $B(OH)_3$ or 292 ppm $B(OH)_4$ wherein the concentration of each such species is dependent upon pH of the produced water according to a simplified chemical equation:

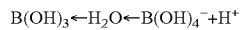

although these pH dependent species are reflected more accurately as

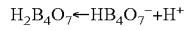

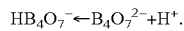

In such water sources, when the pH of the produced water is equal to or greater than about 6.5, sufficient borate oxyanion is present in the produced water to participate in a crosslinking reaction with polysaccharide, thereby eliminating practicable control of the borate concentration necessary to produce a viable fluid for hydraulic fracturing applications.

In addition to issues of overall control of boron concentration, these native boron species create difficulties in delaying crosslinking during travel of the fracturing fluid into the subterranean reservoir. It is often desirable to delay crosslinking until the fluid reaches the reservoir - because injecting a low viscosity fluid reduces the amount of force necessary to accomplish the injection and also reduces wear and tear to the injection equipment. Dissolved borate species present in the fracturing fluid cause the crosslinking of polysaccharide to take place immediately once the pH is raised to about 9 or greater. Since pH adjusting agents are added at the point of injection, that is, at the surface, the dissolved reactive boron species are activated at the point of injection and cause substantially immediate viscosity increase. This in turn leads to the necessity of employing more hydraulic force in order to carry out the injection.

Boron mediated crosslinking can be advantageously delayed by providing a particulate dispersion of a boron species that is slow to dissolve and therefore slow to react, providing the desired delay. For example, U.S. Pat. No. 4,619,776 discloses dispersions of sparingly soluble borates for the delayed crosslinking of hydroxyl functional polymer-containing hydraulic fracturing fluids. The borate dissolves slowly to provide dissolved reactive species available for crosslinking of the polysaccharide. However, when reactive boron species are already dissolved in the water, the crosslinking reaction is very rapid or is substantially instantaneous upon raising the pH of the solution containing the boron species and polysaccharide to above about 9.2.

It would be advantageous to provide hydraulic fracturing compositions and methods for use in a variety of different subterranean conditions, compositions which would allow for penetration of low-permeability zones in addition to or instead of thief zones by proppant bearing fluid. There is a need for such compositions and methods that can function suitably at the high temperatures and pressures found in deep subterranean locations. There is also a need in the industry for compositions and methods to delay complex-mediated crosslinking of hydroxylated polymers in the presence of dissolved reactive boron species. There is a need in the industry for compositions and methods for enabling delayed crosslinking in the presence of produced water. There is a need in the industry for compositions and methods for delaying crosslinking of polysaccharide polymers in produced water.

SUMMARY

Disclosed herein is an injectable solution comprising a crosslinkable polymer, a competing agent comprising a reaction product of a dialdehyde having 2 to 4 carbon atoms with a non-polymeric cis-hydroxyl compound; and a produced water, wherein the injectable solution is adapted for injection thereof into a subterranean reservoir, and recovering a hydrocarbon from the reservoir. In embodiments, the produced water comprises about 10 ppm to 500 ppm boron as dissolved reactive boron species. In embodiments, the dialdehyde comprises, consists, or consists essentially of glyoxal. In embodiments, the non-polymeric cis-hydroxyl compound comprises, consists of, or consists essentially of sorbitol. In embodiments, the crosslinkable polymer is selected from guar gum or carboxymethyl hydroxypropyl guar. In embodiments, the injectable solution further comprises a reaction product obtained by combining a solution of a zirconium tetraalkoxide and an alkanolamine composition comprising an alkanolamine, wherein the molar ratio of the zirconium tetraalkoxide to the alkanolamine is about 1:9. In embodiments, the solution of the zirconium tetraalkoxide comprises, consists of, or consists essentially of zirconium tetra(n-propoxide) and n-propanol, and the alkanolamine composition comprises, consists of, or consists essentially of triethanolamine.

Also disclosed herein is a method of making an injectable solution, the method comprising combining a dialdehyde having 2 to 4 carbons and a non-polymeric cis-hydroxyl compound in an aqueous solution to form a competing agent solution comprising a competing agent, and combining a crosslinkable polymer and the competing agent in a produced water to form the injectable solution, wherein the produced water contains about 10 ppm to 500 ppm boron as dissolved reactive boron species. In embodiments, the method further comprises injecting the injectable solution into the subterranean reservoir, and recovering a hydrocarbon from the reservoir. In embodiments, the dialdehyde comprises, consists of, or consists essentially of glyoxal. In embodiments, the crosslinkable polymer comprises, consists of, or consists essentially of guar gum. In embodiments, the non-polymeric cis-hydroxyl compound comprises, consists of, or consists essentially of sorbitol.

Also disclosed herein is a method of making an injectable solution, the method comprising: combining a dialdehyde having 2 to 4 carbons and a non-polymeric cis-hydroxyl compound in an aqueous solution to form a competing agent solution comprising a competing agent; adjusting the pH of the competing agent solution to maintain a pH of about 6.0 to about 6.5; combining a zirconium tetraalkoxide and an alkanolamine in a solvent to form a crosslinker composition, wherein the combining is carried out at a temperature between about 15° C. and about 46° C. and the molar ratio of zirconium tetraalkoxide to the alkanolamine is about 1:9; maintaining the crosslinker composition at a temperature of from about 35° C. to about 40° C. for 90 to 150 minutes; combining the competing agent solution and the crosslinker composition to form a delayed-crosslinking composition;. and combining a crosslinkable polymer and the delayed-crosslinking composition in a produced water to form the injectable solution. In embodiments, the produced water contains about 10 ppm to 500 ppm boron as dissolved reactive boron species. In embodiments, the method further comprises injecting the injectable solution into the subterranean reservoir, and recovering a hydrocarbon from the reservoir. In embodiments, the dialdehyde comprises, consists of, or consists essentially of glyoxal. In embodiments, the crosslinkable polymer comprises, consists of, or consists essentially of carboxymethyl hydroxypropyl guar. In embodiments, the non-polymeric cis-hydroxyl compound comprises, consists of, or consists essentially of sorbitol. In embodiments, the zirconium tetraalkoxide comprises, consists of, or consists essentially of zirconium tetra(n-propoxide). In embodiments, the solvent is n-propanol. In embodiments, the alkanolamine comprises, consists of, or consists essentially of triethanolamine.

DETAILED DESCRIPTION

Figure 1:
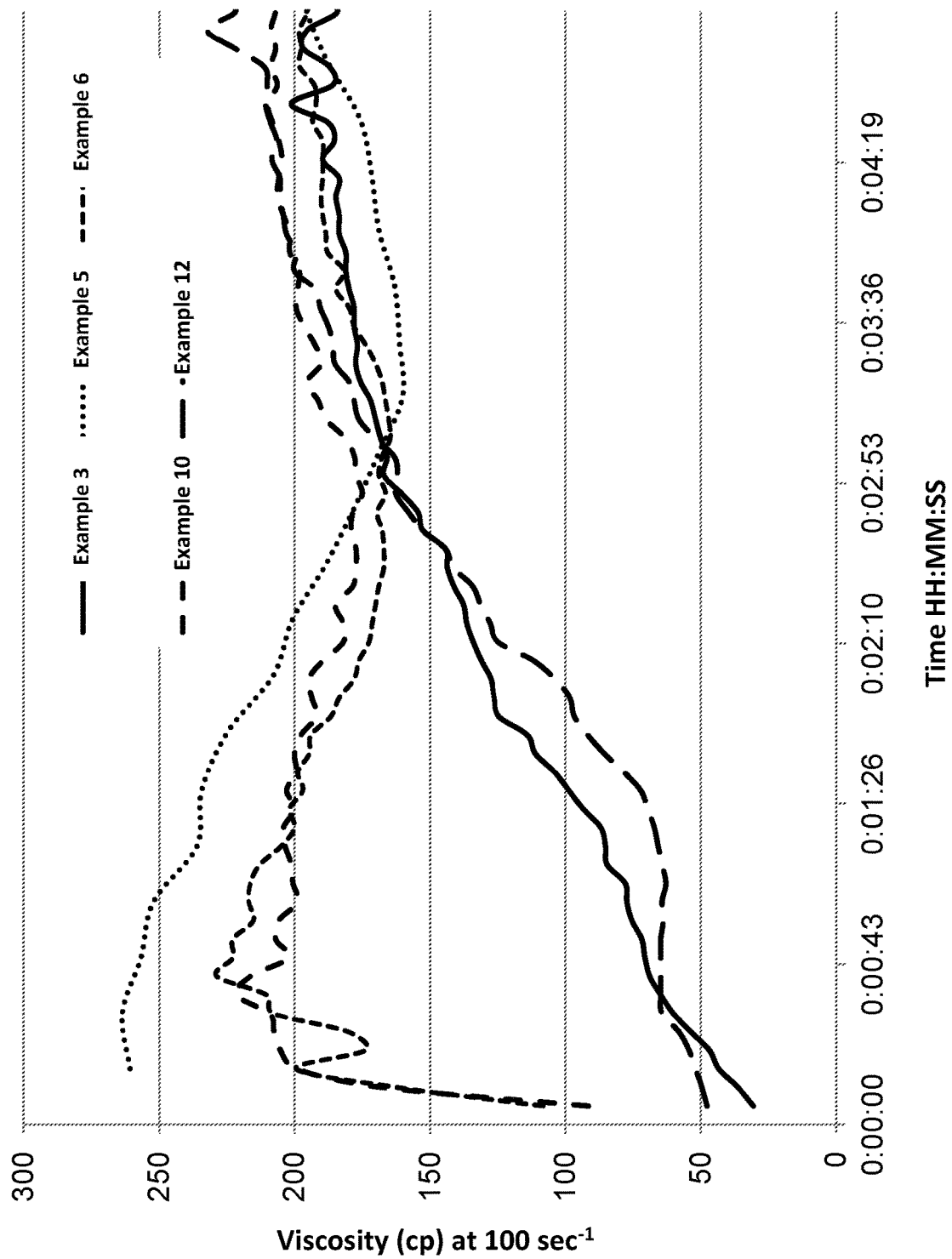
FIG. 1 is a plot of viscosity as a function of time for five injectable solutions.

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the term "produced water" means connate (native water within a reservoir prior to flowback) or flowback water (water that flows from a subterranean reservoir after one or more hydraulic fracturing or other well formation operations). In some embodiments, a produced water contains about 10 ppm to 500 ppm dissolved reactive boron species. In some embodiments, the connate or flowback further contains 500 ppm total dissolved solids to 1000 ppm total dissolved solids, in some embodiments, 1000 ppm to 10,000 ppm, in some embodiments 10,000-50,000 ppm, or in some embodiments 50,000 ppm to 100,000 ppm, in embodiments 100,000-500,000 ppm total dissolved solids.

As used herein, the term "reactive species" means a compound capable of participating in crosslinking reactions with compounds having one or more cis-hydroxyl moieties, unfunctionalized polysaccharides such as guar gum, and/or functionalized polysaccharides such as carboxymethyl hydroxypropyl guar.

As used herein, the term "polysaccharide" includes both unfunctionalized polysaccharides such as guar as well as functionalized polysaccharides such as carboxymethyl hydroxypropyl guar.

As used herein, the term "reactive boron species" means boric acid, tetrahydroxyborate, or another boron-containing compound capable of forming orthoborate ($B(OH)_4^-$) or another boron-containing oxyanion structure at pH of greater than about 6.5 and/or capable of participating in crosslinking reactions with compounds having one or more cis-hydroxyl moieties, including unfunctionalized polysaccharides such as guar gum, and/or functionalized polysaccharides such as carboxymethyl hydroxypropyl guar.

As used herein, the term "source of dissolved reactive boron species" means a source of a compound that is a reactive boron species, or is capable of forming one by chemical transformation or slow dissolution.

As used herein, "complex" means inter alia not only a moiety comprising a metal atom or a metal ion bonded to and/or associated with one or more ligands but also a metalloid atom or ion bonded to and associated with one or more ligands. Ligands can be monodentate, bidentate, and/or polydentate. In this context, ligands can be atoms, ions, molecules, other chemical structures, or combinations thereof. In this context, non-limiting examples of metalloids include boron, silicon, germanium, and antimony. Herein, the term "complex" includes any molecule or ion with a central atom, atoms, ion, or ions having ligands bonded thereto or associated therewith, the complex being capable of crosslinking the crosslinkable polymer. Thus "complex" includes borate oxyanions in addition to more conventional metal complexes with various ligands, and the term includes metal and metalloid oxides, hydroxides, and hydrated oxides with the proviso that they are capable of crosslinking the polymer having cis-functionality.

As used herein, "crosslinker composition" means a composition comprising a crosslinker, wherein the crosslinker is capable of crosslinking a crosslinkable polymer.

As used herein, the term "polymer solution" denotes a polymer either dispersed or dissolved in one or more solvents.

As used herein, the term "cis-hydroxyl" denotes a compound having at least one pair of hydroxyl groups situated in a 1,2 configuration, further wherein the hydroxyls are configured to allow the coordination thereof with a boron oxyanion or a metal complex center.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein an "injected solution" is an injectable solution after injection into a subterranean reservoir and/or any conduit leading thereto and in fluid communication therewith.

As used herein, unless otherwise specified "subterranean reservoir" means any subterranean crude-oil reservoir.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" or "about 1 to about 5", the recitation means "1 to 5" and "about 1 to about 5" and "1 to about 5" and "about 1 to 5" unless specifically limited by context.

As used herein, the term "consisting essentially of" means that the methods and compositions may include additional steps, components, ingredients or the like, but only if the additional steps, components and/or ingredients do not materially alter the basic and novel characteristics of the claimed methods and compositions.

Discussion

Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

We have found methods and compositions for delaying complex-mediated crosslinking of aqueous crosslinkable polymers such as polysaccharides and/or cis-hydroxylated polymer based fluids for hydraulic fracturing and related applications when an injectable solution is formed using a produced water containing about 10 ppm or more of dissolved reactive borate species. The methods and compositions are also advantageously used when an injectable solution is formed using water absent 10 ppm or more of dissolved reactive borate species. We have also found methods and compositions suitable for delaying complex-mediated crosslinkable polymers that are subject to high temperatures and pressures in subterranean locations, for example temperatures exceeding 200° C. In embodiments, the methods and compositions include a competing agent that is the reaction product of a non-polymeric cis-hydroxyl compound and a dialdehyde. In further embodiments, the methods and compositions include a combination of a crosslinker composition and a solution of the competing agent (herein "competing agent solution") to provide a delayed-crosslinking composition.

First Embodiments

In first embodiments, there is provided an injectable solution comprising, consisting of, or consisting essentially of a crosslinkable polymer, a competing agent comprising a reaction product of a dialdehyde having 2 to 4 carbon atoms with a non-polymeric cis-hydroxyl compound, and at least one water source, wherein the injectable solution is adapted for injection thereof into a subterranean reservoir. In embodiments, the at least one water source comprises, consists of, or consists essentially of a produced water. In some such embodiments, the produced water comprises about 10 ppm to 500 ppm boron present as dissolved reactive boron species. The injectable solution is adapted for injection thereof into a subterranean reservoir. As applied to the injectable solutions described herein, the phrase "adapted for injection into a subterranean reservoir" means that all recited components of an injectable solution are combined, wherein the combination is situated outside of a subterranean reservoir. The composition adapted for injection into a subterranean reservoir has a lower viscosity than the injected solution after injection; that is, the injectable solution adapted for injection into a subterranean reservoir includes the components of the solution combined in amounts and ratios suitable to provide an increase in viscosity after the injectable solution is injected into a subterranean reservoir. The injectable solution adapted for injection into a subterranean reservoir includes the components of the solution combined in amounts and ratios suitable for injection into a subterranean reservoir pursuant to crude oil recovery therefrom.

In some first embodiments, the injectable solution further comprises a crosslinker composition comprising, consisting of, or consisting essentially of one or more crosslinkers. Therefore, in some first embodiments of the invention, the injectable solution comprises, consists of, or consists essentially of the crosslinkable polymer, the competing agent comprising the reaction product of a dialdehyde having 2 to 4 carbon atoms with the non-polymeric cis-hydroxyl compound, a crosslinker composition comprising, consisting of, or consisting essentially of one or more crosslinkers, and the at least one water source. In embodiments, the one or more crosslinkers comprises, consists of, or consists essentially of a complex. In some embodiments, the at least one water source comprises one or more reactive species that acts as a crosslinker for the crosslinkable polymer. In other embodiments, the at least one water source substantially excludes one or more reactive species that acts as a crosslinker for the crosslinkable polymer. In embodiments, the at least one water source is selected from a produced water, tap water, ground water, surface water, seawater, wastewater, deionized water, distilled water, or any combination thereof. In embodiments, the at least one water source comprises, consists of, or consists essentially of a produced water. In some such embodiments, the produced water comprises about 10 ppm to 500 ppm boron present as dissolved reactive boron species.

The terms produced water, tap water, ground water, surface water, seawater, wastewater, deionized water, and distilled water herein are construed to include such water sources having undergone further processing such as adulteration; or purification steps such as, but not limited to, filtration, activated carbon treatment, lime softening, sedimentation, and the like.

In some of the first embodiments, the injectable solution is made by combining the at least one water source; the crosslinkable polymer; a competing agent solution comprising, consisting of, or consisting essentially of the competing agent and one or more competing agent solvents, and the crosslinker composition comprising one or more crosslinkers. In some such embodiments, the one or more competing agent solvents comprises, consists of, or consists essentially of a produced water, tap water, ground water, surface water, seawater, wastewater, deionized water, distilled water, or any combination thereof In embodiments, the injectable solution of the first embodiments is made by combining an aqueous solution of the crosslinkable polymer, the competing agent solution, and the crosslinker composition. In some embodiments, the aqueous solution of the crosslinkable polymer comprises, consists of, or consists essentially of the crosslinkable polymer and an aqueous solvent comprising, consisting of, or consisting essentially of a produced water, tap water, ground water, surface water, seawater, wastewater, deionized water, distilled water, or any combination thereof.

In embodiments, the injectable solution of the first embodiments is made by combining the at least one water source, the aqueous solution of the crosslinkable polymer, the competing agent solution, and the crosslinker composition.

In embodiments, the injectable solution of the first embodiments is made by combining the at least one water source, the crosslinkable polymer, and a delayed-crosslinking composition, wherein the delayed-crosslinking composition comprises, consists of, or consists essentially of the competing agent solution and the crosslinker composition. In embodiments, the crosslinker composition comprises a zirconium (IV) complex.

In embodiments, the injectable solution of the first embodiments is made by combining the aqueous solution of the crosslinkable polymer and the delayed-crosslinking composition.

In embodiments, the injectable solution of the first embodiments is made by combining the at least one water source, the aqueous solution of the crosslinkable polymer, and the delayed-crosslinking composition.

The crosslinker composition of the first embodiments comprises, consists of, or consists essentially of one or more crosslinkers. The one or more crosslinkers are capable of crosslinking the crosslinkable polymer. In embodiments, one or more of the one or more crosslinkers is a complex. In embodiments, the one or more crosslinkers comprises, consists of, or consists essentially of an aluminum, antimony, boron, chromium, copper, iron, lead, manganese, niobium, titanium, zinc, or zirconium complex, wherein the complex has an atom or ion selected from aluminum, antimony, boron, chromium, copper, iron, lead, manganese, niobium, titanium, zinc, or zirconium respectively, and has a coordination number of between two and six. It will be appreciated that herein, the term "complex" includes any molecule or ion with an atom, atoms, ion, or ions having ligands bonded thereto or associated therewith, the complex being capable of crosslinking the crosslinkable polymer. Thus "complex" includes borate oxyanions in addition to more conventional metal complexes with various ligands, and the term includes metal and metalloid oxides, hydroxides, and hydrated oxides with the proviso that they are capable of crosslinking the polymer having cis-functionality. In embodiments, the crosslinker composition comprises, consists of, or consists essentially of a complex of a metalloid and hydroxide, hydrated oxide, or oxide ligands. In embodiments, the complex is a reactive boron species. In embodiments, the crosslinker composition comprises, consists of, or consists essentially of a complex of a metal and one or more ligands selected from alkanolamine, lactate, citrate, maleate, citraconate, tartrate, bitartrate, primary organic amine, secondary organic amine, tertiary organic amine, or acac (acetylacetonate). In some such embodiments, the alkanolamine comprises, consists of, or consists essentially of triethanolamine. In embodiments, the crosslinker composition comprises, consists of, or consists essentially of a zirconium complex. In embodiments, the zirconium complex comprises, consists of, or consists essentially of a zirconium (IV) complex that is the reaction product of tetra(n-propoxy) zirconium with an alkanolamine. In some such embodiments, the zirconium complex is a zirconium (IV) complex that is the reaction product of tetra(n-propoxy) zirconium with triethanolamine.

In embodiments, the molar ratio of the zirconium complex to the competing agent in the crosslinker composition is about 5:1 to 1:20, in embodiments 5:1 to 1:10, in embodiments 5:1 to 1:5, in embodiments 5:1 to 1:1, in embodiments, 5:1 to 2:1, in embodiments 5:1 to 3:1, in embodiments about 4:1, in embodiments 3.9:1. In some such embodiments, the molar ratio is the molar ratio of sorbitol equivalent to zirconium in the injectable solution. The sorbitol equivalent is the amount of the reaction product of sorbitol and the dialdehyde plus the amount of any unreacted sorbitol.

In embodiments, the crosslinker composition is a product obtained by combining a zirconium (IV) alkoxide and an alkanolamine. In embodiments, the crosslinker composition is a product obtained by combining a zirconium tetraalkoxide and an alkanolamine. In embodiments, the alkanolamine comprises, consists of, or consists essentially of triethanolamine. In embodiments, the crosslinker is the product of combining a zirconium tetraalkoxide solution in a first alcoholic solvent with an alkanolamine. In embodiments, the alkanolamine is not dissolved or dispersed in a solvent. In embodiments, the alkanolamine is dissolved and/or dispersed in a second alcoholic solvent. In embodiments, the first and second alcoholic solvents are the same. In embodiments, the first and second alcoholic solvents are different. In embodiments, each of the first and second alcoholic solvents comprises, consists of, or consists essentially of a C1 to C7 alcohol. In embodiments, the crosslinker composition is the product of combining triethanolamine with a zirconium tetraalkoxide solution in a C1 to C7 alcohol. In embodiments, the crosslinker composition is the product of combining triethanolamine with a zirconium tetra(n-propoxide) solution in n-propanol. In embodiments, the crosslinker composition is the product of combining triethanolamine and a zirconium tetra(isopropoxide) solution in a first alcoholic solvent comprising, consisting of, or consisting essentially of isopropanol. In embodiments, the crosslinker composition is the product of combining triethanolamine and a zirconium tetra(n-butoxide) solution in a first alcoholic solvent comprising, consisting of, or consisting essentially of n-butanol. In embodiments, the crosslinker composition is the product of combining triethanolamine and a zirconium tetra(t-butoxide) solution in a first alcoholic solvent comprising, consisting of, or consisting essentially of t-butanol. In embodiments, the crosslinker composition is the product of combining triethanolamine and a zirconium tetra(i-butoxide) solution in a first alcoholic solvent comprising, consisting of, or consisting essentially of i-butanol. In embodiments, the crosslinker composition is the product of combining triethanolamine and a zirconium tetraethoxide solution in a first alcoholic solvent comprising, consisting of, or consisting essentially of ethanol. In embodiments, the molar ratio of the zirconium to alkanolamine is between about 1:5 and about 1:11, in embodiments about 1:6 to 1:11, in embodiments about 1:7 to about 1:10, in embodiments about 1:8 to 1:10, in embodiments about 1:9. In some such embodiments, the alkanolamine comprises, consists of, or consists essentially of triethanolamine. Crosslinker compositions that are the product of combining triethanolamine and zirconium tetra(alkoxide) in a molar ratio of 1:8 to 1:10 are especially useful as a component of injectable solutions for high downhole temperature applications.

Second Embodiments

Disclosed is a method that includes combining a crosslinkable polymer and a competing agent in a produced water, the produced water containing about 10 ppm to 500 ppm boron as dissolved reactive boron species, to form a polymer solution, wherein the pH of the polymer solution is less than about 6.5. In embodiments, the produced water employed to form the polymer solution also contains up to about 35 wt % of dissolved solids in addition to the dissolved reactive boron species. Maintaining a pH of less than about 6.5 substantially prevents crosslinking of the crosslinkable polymer with the dissolved reactive boron species present in the produced water. The competing agent comprises, consists essentially of, or consists of the reaction product of a dialdehyde and a non-polymeric cis-hydroxyl compound. In embodiments, the non-polymeric cis-hydroxyl alcohol is a sugar alcohol. Once the polymer solution is formed, that is once the crosslinkable polymer is fully dissolved or hydrated, the pH of the polymer solution is raised to at least 8.5 and as high as about 13 to form an injectable solution. Optionally, a source of dissolved reactive boron is added to the polymer solution or the injectable solution. The injectable solution is injected into the subterranean reservoir immediately or as quickly as practicable. The competing agent competes with the crosslinkable polymer for the dissolved reactive boron species, thereby delaying the onset of polymer crosslinking, which in turn results in a delay in the increase of viscosity of the injectable solution, or a "delay period". The optional source of dissolved reactive boron is an effective amount of a sparingly soluble borate, such as the sparingly soluble borates described in U.S. Patent No. 4,619,776; or an additional amount and an effective amount of a reactive boron species combined with an additional amount and an effective amount of a competing agent.

Prior to forming the injectable solution, the polymer solution has a viscosity in some embodiments of about 100 cP or less when measured at a shear rate of about 100 s$^{-1}$, for example about 5 cP to 100 cP, or about 10 cP to 100 cP, or about 15 cP to 100 cP, or about 20 cP to 100 cP, or about 25 cP to 100 cP, or about 30 cP to 100 cP, or about 35 cP to 100 cP, or about 40 cP to 100 cP, or about 45 cP to 100 cP, or about 50 cP to 100 cP, or about 5 cP to 95 cP, or about 5 cP to 90 cP, or about 5 cP to 85 cP, or about 5 cP to 80 cP, or about 5 cP to 75 cP, or about 5 cP to 70 cP, or about 5 cP to 65 cP, or about 5 cP to 60 cP, or about 5 cP to 55 cP, or about 5 cP to 50 cP, or about 10 cP to 90 cP, or about 20 cP to 80 cP, or about 30 cP to 80 cP, or about 40 cP to 80 cP, or about 50 cP to 80 cP. One of skill will understand that the viscosity of the polymer solution is selected to meet the requirements of the particular reservoir and equipment employed to apply to the reservoir such polymer solutions and/or injectable solutions formed from them.

Employing the methods of the second embodiments of the invention, the delay period is evidenced by a delay in the onset of viscosity increase of the injectable solution of about 30 seconds to 8 minutes, or about 30 seconds to 7 minutes, or about 30 seconds to 6 minutes, or about 45 seconds to 6 minutes, or about 1 minute to 6 minutes, or about 1 minute 30 seconds to 6 minutes, or about 2 minutes to 6 minutes, or about 2 minutes 30 seconds to 6 minutes, or about 3 minutes to 6 minutes, or about 30 seconds to 5 minutes 30 seconds, or about 30 seconds to 5 minutes, or about 30 seconds to 4 minutes 30 seconds, or about 30 seconds to 4 minutes, or about 30 seconds to 3 minutes 30 seconds, or about 30 seconds to 3 minutes, or about 1 minute to 4 minutes, or about 2 minutes to 4 minutes. Such a delay is sufficient to enable pumping the injectable solution through the injection equipment and associated pipes etc. at a low viscosity.

Viscosity of the injectable solution then increases downhole and/or within the subterranean reservoir, where permeability differences between different areas of the reservoir are advantageously addressed and wherein proppant is advantageously transported into the fractures formed in the rock by the injectable solution during application of hydraulic pressure thereto. Further, conditions within the subterranean reservoir often include temperatures over about 20° C., for example about 30° C. to 100° C. and often about 50° C. to 80° C., for example about 60° C. to 80° C. or about 65° C. to 75° C. For this reason, viscosity measurements in the laboratory are determined over a range of temperatures from about 20° C. to 65° C. in order to more accurately predict initial and peak viscosities of the injectable solutions of the invention in the field.

Advantageously, the peak viscosity of the injectable solution is about 100 cP to 1500 cP when measured at about 65° C. and 100 s$^{-1}$ as determined by one of skill upon forming an injectable solution. It is an advantage of the methods and compositions of the invention that use of the injectable solutions provides substantially the same peak viscosity as would be achieved with the same injectable solution exclusive of the competing agent and injected into the same reservoir. After reaching peak viscosity, it is desirable for the injectable solution to maintain this viscosity for at least about 45 minutes and up to about 180 minutes. It is an advantage of the methods and compositions of the invention that the injectable solutions provide substantially the same period of peak viscosity as would be achieved with the same injectable solution exclusive of the competing agent and injected into the same reservoir. Stated differently, we have found that the competing agents of the invention affect performance of the injectable solutions substantially only as to the delay period.

The invention of the second embodiments is contraindicated by H. Deuel, H. Neukom, F. Weber, Nature, Jan. 17, 1948, p. 96-96, who teach that addition of sugars and sugar alcohol compounds to gels of boron and polysaccharides results in liquefaction, i.e., breaking of the crosslinked gel and concomitant loss of ability of the fluid to effectively transport proppant. The present invention differs from Card et al., U.S. Pat. No. 5,877,127 in that the present invention addresses hydraulic fracturing fluid formed using water sources comprising dissolved reactive boron species. Previously, methods for delaying boron-mediated crosslinking of crosslinkable polymers in fracturing fluids were carried out using water sources characterized as substantially excluding reactive boron species and less than about 50,000 ppm total dissolved solids. In these previous methods, only boron species deliberately added to the fluid were addressed in terms of providing a delay period. The second embodiments provide compositions and methods for mitigating the effect of dissolved reactive boron species present in the water used to form an injectable solution including a crosslinkable polymer. The presently disclosed compositions and methods of the second embodiments are also suitable for use in embodiments wherein an additional source of dissolved reactive boron species is deliberately added to an injectable solution, or a different mechanism of delay is employed, such as use of a sparingly soluble borate as disclosed in U.S. Pat. No. 4,619,776.

More particularly, there is provided a method for recovery of hydrocarbons from a subterranean reservoir, the method comprising: providing a water source comprising 10 ppm to 500 ppm elemental boron as dissolved reactive boron species; adjusting the pH of the water source to about 5 to 6.5; adding a crosslinkable polymer and a competing agent to the water source to form a polymer solution; optionally adding an additional source of dissolved reactive boron species to the polymer solution; and adding a pH control agent and a proppant to the polymer solution to form an injectable solution having a pH of about 8.5 to 13; hydraulically injecting the injectable solution into a subterranean reservoir; and recovering one or more hydrocarbons from the subterranean reservoir.

In some embodiments the water source is a produced water; in other embodiments the water source is a surface water. Water sources usefully addressed by the methods of the present invention include those sources having at least 10 ppm elemental boron. Concentrations of boron in surface water range widely; however, average boron concentrations in surface water sources are typically well below 0.6 ppm in most regions of the world. In sharp contrast, produced water often includes 10 ppm or more of elemental boron. The water sources usefully addressed by the methods of the invention include about 10 ppm to 500 ppm elemental boron present in the water source as dissolved reactive boron species, or about 12 ppm to 500 ppm, or about 14 ppm to 500 ppm, or about 16 ppm to 500 ppm, or about 18 ppm to 500 ppm, or about 20 ppm to 500 ppm, or about 25 ppm to 500 ppm, or about 30 ppm to 500 ppm, or about 35 ppm to 500 ppm, or about 40 ppm to 500 ppm, or about 45 ppm to 500 ppm, or about 50 ppm to 500 ppm, or about 55 ppm to 500 ppm, or about 60 ppm to 500 ppm, or about 65 ppm to 500 ppm, or about 70 ppm to 500 ppm, or about 75 ppm to 500 ppm, or about 80 ppm to 500 ppm, or about 85 ppm to 500 ppm, or about 90 ppm to 500 ppm, or about 95 ppm to 500 ppm, or about 100 ppm to 500 ppm, or about 110 ppm to 500 ppm, or about 120 ppm to 500 ppm, or about 130 ppm to 500 ppm, or about 140 ppm to 500 ppm, or about 150 ppm to 500 ppm, or about 175 ppm to 500 ppm, or about 200 ppm to 500 ppm, or about 250 ppm to 500 ppm, or about 300 ppm to 500 ppm, or about 350 ppm to 500 ppm, or about 400 ppm to 500 ppm, or about 450 ppm to 500 ppm, or about 10 ppm to 400 ppm, or about 10 ppm to 350 ppm, or about 10 ppm to 300 ppm, or about 10 ppm to 250 ppm, or about 10 ppm to 200 ppm, or about 10 ppm to 150 ppm, or about 10 ppm to 140 ppm, or about 10 ppm to 130 ppm, or about 10 ppm to 120 ppm, or about 10 ppm to 110 ppm, or about 10 ppm to 100 ppm, or about 20 ppm to 300 ppm, or about 20 ppm to 200 ppm, or about 20 ppm to 150 ppm, or about 20 ppm to 120 ppm elemental boron, present as dissolved reactive boron species.

In addition to dissolved reactive boron species, produced water often has a total dissolved solids content at least about 1 wt %, and up to about 35 wt %. The dissolved solids include various ions. Table 1 shows representative analyses of some cations as well as chloride anion present in a sample of a produced water obtained from the Permian Basin region of the United States, as measured by inductively coupled plasma (ICP) analysis or titration in the case of chloride anion. While these measurements are not a total analysis, one of skill will appreciate that in addition to dissolved boron species, large concentrations of ions, such as sodium, cause solution instability when injectable solutions are formed using produced water. Instability is evidenced by formation of gel particles, coagulum, polymer coated out on contact surfaces, and the like. The products of this instability cause plugged equipment in the field, reduced reservoir permeability, plugged formation, and ultimately failure to accomplish mobility control within the reservoir. Further, some ions present in the produced water, such as iron, are also capable of ionic or coordination reactions with cis-hydroxylated compounds. The presence of such ions further complicates attempts to use produced water to provide delayed crosslinking of crosslinkable polymers. It is a feature of the invention that the injectable solutions formed according to the invention do not suffer from instability in the presence of the various ions, including those that can react with cis-hydroxylated compounds. It is a feature of the invention that when the competing compound is included in an injectable solution formed using produced water, observable crosslinking of crosslinkable polymers, manifested as an increase in viscosity, is delayed for at least 30 seconds and as long as 5 minutes.

TABLE 1

ICP analysis of some elements measured in produced water obtained from the Permian Basin region.

| Element | Concentration, mg/L |
|---------|---------------------|
| Ba      | 1.9                 |
| B       | 39                  |
| Ca      | 1900                |
| Fe      | 83                  |
| Mg      | 270                 |

TABLE 1-continued

ICP analysis of some elements measured in produced water obtained from the Permian Basin region.

| Element | Concentration, mg/L |
|---|---|
| K | 510 |
| Na | 40,000 |
| Sr | 440 |
| Cl* | 68,000 |
| Si | 11 |

*Cl was determined titrimetrically.

In embodiments, the pH of the water source employed in forming the polymer solution is or is adjusted to be about 5 to 8, or about 5.1 to 8, or about 5.2 to 8, or about 5.3 to 8, or about 5.4 to 8, or about 5.5 to 8, or about 5.6 to 8, or about 5.7 to 8, or about 5.8 to 8, or about 5.9 to 8, or about 6.0 to 8, or about 6.1 to 8, or about 6.2 to 8, or about 6.3 to 8, or about 6.4 to 8, or about 6.5 to 8, or about 5 to 7.9, or about 5 to 7.8, or about 5 to 7.6, or about 5 to 7.4, or about 5 to 7.2, or about 5 to 7.0, or about 5 to 6.9, or about 5 to 6.8, or about 5 to 6.7, or about 5 to 6.6, or about 5 to 6.5, or about 5 to 6.4, or about 5 to 6.3, or about 5 to 6.2, or about 5 to 6.1, or about 5 to 6.0, or about 5 to 5.9, or about 5 to 5.8, or about 5 to 5.7, or about 5 to 5.6, or about 5 to 5.5, or about 5 to 5.4, or about 5 to 5.3, or about 5.5 to 7, or about 5.5 to 6.5. In some embodiments, the water source employed to form the polymer solution has a pH within the suitable range, and no adjustment of pH is carried out prior to forming a polymer solution from the water source. In other embodiments, the pH is lower than 5 or higher than 8 and adjustment is necessary to provide pH in a suitable range for polymer solution formation. In embodiments, a water source having a pH of less than 5 is acceptable to use in forming the polymer solution, since the low pH prevents substantial crosslinking by the dissolved reactive boron species. However, in other embodiments use of water source having a pH of less than about 5 is impractical due to the amount of pH adjustment agent required in order to increase the pH to 8.5 or greater during formation of the injectable solution, lowered solubility of the crosslinkable polymer, or both. Thus, where pH of the water source is less than about 5, it is a selection of the user to adjust the pH to 5 or greater or simply use the water source without adjusting the pH prior to forming the polymer solution.

Agents employed to adjust the pH of the water source to about 5 from below about 5 are bases. Suitable bases for use in the methods of the invention are not particularly limited and include any chemical species or molecular entity that is soluble in water and has an available pair of electrons capable of forming a covalent bond with a proton (Brønsted base) or with the vacant orbital of some other species (Lewis base). Commonly employed bases include sodium, potassium, or calcium hydroxide. Agents employed to adjust the pH of the water source to about 6.5 or less starting from a pH above about 6.5 are acids. Suitable acids for use in the methods of the invention are not particularly limited and include any chemical species or molecular entity that is soluble in water and capable of donating a proton (Brønsted acid) or capable of forming a covalent bond with an electron pair (Lewis acid). Commonly employed acids include sulfonic acid, phosphoric acid, hydrochloric acid, organic acids such as citric acid or acetic acid, sulfamic acid, and nitric acid. The amount of acid or base is not limited and are added in a suitable amount to reach the target pH, as will be understood by those of skill.

In embodiments, the crosslinkable polymer employed in the second embodiments to form the polymer solution is any polymeric compound having a weight average molecular weight of greater than about 10,000 g/mol and up to about 10,000,000 g/mol and at least 50 mole % repeat units comprising one or more cis-hydroxyl moieties. A cis-hydroxyl moiety is a pair of hydroxyl groups situated in a 1,2 configuration, further wherein the hydroxyls are configured to allow the coordination thereof with a borate oxyanion. Such configurations include cis-1,2-hydroxy groups on rigid ring structures such as sugars and on unsaturated C=C bonds as well as compounds having freely rotating C—C bonds wherein both carbons bear hydroxyl moieties and wherein rotation of the C—C bond can produce hydroxyls in a substantially eclipsed configuration when viewed as a Newman projection. Collectively, such compounds are denoted cis-hydroxyl compounds. A cis-hydroxylated polymer is a cis-hydroxylated compound having one or more repeat units bearing a cis-hydroxyl moiety and a weight average molecular weight of about 10,000 g/mol to 10,000,000 g/mol, or about 20,000 g/mol to 10,000,000 g/mol, or about 30,000 g/mol to 10,000,000 g/mol, or about 40,000 g/mol to 10,000,000 g/mol, or about 50,000 g/mol to 10,000,000 g/mol, or about 60,000 g/mol to 10,000,000 g/mol, or about 70,000 g/mol to 10,000,000 g/mol, or about 80,000 g/mol to 10,000,000 g/mol, or about 90,000 g/mol to 10,000,000 g/mol, or about 100,000 g/mol to 10,000,000 g/mol, or about 200,000 g/mol to 10,000,000 g/mol, or about 300,000 g/mol to 10,000,000 g/mol, or about 500,000 g/mol to 10,000,000 g/mol, or about 1,000,000 g/mol to 10,000,000 g/mol, or about 20,000 g/mol to 9,000,000 g/mol, or about 20,000 g/mol to 8,000,000 g/mol, or about 20,000 g/mol to 7,000,000 g/mol, or about 20,000 g/mol to 6,000,000 g/mol, or about 20,000 g/mol to 5,000,000 g/mol, or about 20,000 g/mol to 4,000,000 g/mol, or about 20,000 g/mol to 3,000,000 g/mol, or about 20,000 g/mol to 2,000,000 g/mol, and further comprises at least 10 mole % repeat units comprising one or more cis-hydroxyl moieties, for example 10 mole % to 100 mole %, or about 20 mole % to 100 mole %, or about 30 mole % to 100 mole %, or about 40 mole % to 100 mole %, or about 50 mole % to 100 mole %, or about 60 mole % to 100 mole %, or about 70 mole % to 100 mole %, or about 80 mole % to 100 mole %, or about 90 mole % to 100 mole %, or substantially 100 mole % repeat units comprising one or more cis-hydroxyl moieties.

Suitable cis-hydroxylated polymers include galactomannan polymers having a weight average molecular weight of about 50,000 g/mol to 8,000,000 g/mol, or about 100,000 g/mol to 5,000,000 g/mol, or about 1,000,000 g/mol to 3,000,000 g/mol. Galactomannan polymer, as employed herein, refers to those naturally occurring polysaccharides derived from various endosperms of seeds. They are primarily composed of D-mannose and D-galactose units. Examples of some plants producing seeds containing galactomannan gums include Tara, Huizache, locust bean, Pola verde, Flame tree, guar bean plant, Honey locust, Lucerne, Kentucky coffee bean, Japanese pagoda tree, Indigo, Jenna, Rattlehox, Clover, Fenergruk seeds and Soy bean hulls. Also useful are polysaccharides that are derivatives of galactomannan polymers. In some embodiments, the polysaccharide is provided in a convenient dry, particulate form generally smaller than what will be retained on a No. 20 mesh sieve (U.S. Standard Sieve Series) but larger than that which passes through a No. 200 mesh sieve. Of these polysaccharides, guar and its derivatives are preferred. Specifically, these include guar gum, locust bean gum, karaya gum, carboxymethylguar, hydroxyethylguar, carboxymethylhydroxyethylguar, hydroxypropylguar (HPG), carboxymethylhydroxypropylguar, and combinations thereof. Guar is a branched copolymer composed of a mannose backbone with galactose branches; the ratio of mannose to galactose in guar is dependent on and characteristic of the endosperm from which it is derived. Mannose:galactose can range, for example, from 1:1 to more than 3:1.

The polysaccharides are generally provided in solid, powder form, or in a hydrocarbon such as diesel or kerosene. When added to a neutral or acidic aqueous solution, the polysaccharides, e.g., galactomannan gum, hydrate to form a solution. Hydration of the polysaccharides, e.g., guar and HPG, will only take place under neutral or acidic conditions, that is, at a pH of about 7 or less. Under these pH conditions, no crosslinking of the polysaccharides will occur with dissolved borate ion. In order to effect borate crosslinking of guar and HPG, the pH must be raised to at least 8.5, in embodiments to at least 9.5, in embodiments at least 10.5, and as high as 13.

The competing agent is the reaction product of a dialdehyde and a non-polymeric cis-hydroxyl compound. In embodiments, the dialdehyde is a water soluble dialdehyde. In embodiments, the non-polymeric cis-hydroxyl compound is a water soluble non-polymeric cis-hydroxyl compound. Suitable dialdehydes have 2 to 4 carbons total and 0 to 2 carbons between aldehyde moieties; examples of suitable dialdehydes include glyoxal, maleic dialdehyde, fumaric dialdehyde, glutaric dialdehyde, and the reaction product of glucose with $NaIO_4$. Non-polymeric cis-hydroxyl compounds include sugar alcohols having 3 to 7 carbons and at least one cis-hydroxyl moiety, and cis-hydroxyl oligomers having a molecular weight of less than 10,000 g/mol, for example vinyl alcohol head-to-tail oligomers having a weight average molecular weight of about 500 g/mol to 5,000 g/mol. Suitable sugar alcohols include threitol, pentaerythritol, arabitol, xylitol, ribitol, mannitol, sorbitol, galactitol, fucitol (6-deoxy-L-galactitol), iditol, inositol, volemitol, and glycerol.

The dialdehyde and the cis-hydroxyl compound are suitably combined in water in about a 3:1 to 1:3 molar ratio, or in about a 2:1 to 1:2 molar ratio, or in about a 1:1 molar ratio, and in some embodiments heated to about 60° C. to 100° C. for about 15 minutes to 6 hours to form the competing agent. In embodiments, the combining is carried out in water at a concentration that provides about 40 wt % to 80 wt % of the competing agent at the end of the reaction, for example about 50 wt % to 80 wt %, or about 60 wt % to 80 wt %, or about 40 wt % to 70 wt %, or about 40 wt % to 60 wt % of the competing agent. The pH of the reaction solution may be adjusted to be about 6.5 to 6; however, it is not necessary to do so to drive the reaction. In some embodiments, the pH of the reaction solution decreases as the reaction progresses. In some embodiments, the pH of the reaction product when no pH adjustment is carried out is about 4 to 5.

In some embodiments, the competing agent is isolated, such as by drying the water from the combination, and the dry competing agent is added along with a cis-hydroxylated polymer to form a polymer solution. In other embodiments, the aqueous solution of competing agent after synthesis is added directly to a polymer solution. The competing agent is added to the injectable solution at about 0.01 wt % to 1 wt %, or about 0.05 wt % to 1 wt %, or about 0.1 wt % to 1 wt %, or about 0.01 wt % to 0.9 wt %, or about 0.01 wt % to 0.8 wt %, or about 0.01 wt % to 0.7 wt %, or about 0.01 wt % to 0.6 wt %, or about 0.01 wt % to 0.5 wt %, or about 0.01 wt % to 0.4 wt %, or about 0.01 wt % to 0.3 wt %, or about 0.01 wt % to 0.2 wt %, or about 0.05 wt % to 0.5 wt %, or about 0.1 wt % to 0.5 wt % in the injectable solutions of the invention. Alternatively, the competing agent is added to the injectable solution in a concentration of about $1\times10^{-4}$ M (molar) to about $1\times10^{-6}$ M.

One of skill will appreciate that the amount of competing agent added to the polymer solution is suitably adjusted according to the amount of dissolved reactive boron species in the produced water targeted to form the injectable solutions of the invention. The dissolved present boron is present as found in the produced water and optionally further as added to the polymer solution. In embodiments, the molar ratio of total dissolved reactive boron species to competing agent in the injectable solution is adjusted to be about 5:1 to 1:20, where "total dissolved reactive boron species" comprises, consists essentially of, or consists of the concentration of dissolved reactive boron species present in the produced water, plus the dissolved reactive boron species optionally added to the injectable solution. Thus, in embodiments, the molar ratio of total dissolved reactive boron species to competing agent in the injectable solution is targeted at about 5:1 to 1:20, or about 4:1 to 1:20, or about 3:1 to 1:20, or about 2:1 to 1:20, or about 1:1 to 1:20, or about 5:1 to 1:18, or about 5:1 to 1:16, or about 5:1 to 1:14, or about 5:1 to 1:12, or about 5:1 to 1:10, or about 5:1 to 1:8, or about 5:1 to 1:6, or about 5:1 to 1:5, or about 5:1 to 1:4, or about 5:1 to 1:3, or about 5:1 to 1:2, or about 5:1 to 1:1, or about 2:1 to 1:10, or about 2:1 to 1:5, or about 2:1 to 1:2, or even about 1:1. Total dissolved reactive boron species is suitably determined by analyzing the characteristic concentration of dissolved boron species present in produced water obtained from a particular geographic region, determining the amount of optional additional reactive boron species for addition to the injectable solution suitable to carry out the crosslinking reaction, and adding the competing agent to the injectable solution in an amount that targets the ranges of molar ratios stated above.

A polymer solution is suitably formed by combining the competing agent and the selected crosslinkable polymer in the produced water, optionally further combining with additional boron species, wherein the pH of the produced water is or is adjusted to be about 6.5 or less prior to the addition of the crosslinkable polymer. Order of addition of components to the polymer solution is not critical, except that it is preferable in some embodiments to add the competing agent prior to or contemporaneously with addition of the cis-hydroxylated polymer to prevent even minor amounts of crosslinking from occurring. The combining is carried out using standard admixing procedures familiar to one of skill. After the combining, in some embodiments a suitable period of time is provided for hydration and full dissolution of the cis-hydroxylated polymer. A suitable period of hydration is dependent on temperature, pH, ionic content and total dissolved solids of the produced water and the polymer solution, in addition to concentration and molecular weight of the crosslinkable polymer in the polymer solution. The hydration period is sufficient to provide maximum viscosity of the combination, an indication of maximum hydrodynamic volume of the polymer. In some embodiments, hydration of the cis-hydroxylated polymer is achieved in about 30 seconds to about 10 minutes, or about 1 minute to 10 minutes, or about 1 minute to 5 minutes, or about 1 minute to 3 minutes. In some embodiments, agitation of the polymer solution is continued throughout the hydration period.

In embodiments, the amount of cis-hydroxylated polymer in the polymer solution is about 10 ppt (pounds per thousand gallons) to 200 ppt, or about 10 ppt to 180 ppt, or about 10 ppt to 160 ppt, or about 10 ppt to 140 ppt, or about 10 ppt to 120 ppt, or about 10 ppt to 100 ppt, or about 10 ppt to 80 ppt, or about 10 ppt to 60 ppt, or about 10 ppt to 50 ppt, or about 10 ppt to 40 ppt, or about 10 ppt to 30 ppt, or about 10 ppt to 20 ppt, or about 12 ppt to 100 ppt, or about 14 ppt to 100 ppt, or about 16 ppt to 100 ppt, or about 18 ppt to 100 ppt, or about 20 ppt to 100 ppt, or about 15 ppt to 50 ppt, or about 15 ppt to 30 ppt.

After formation of the polymer solution and the hydration period, an injectable solution is formed by adding to the polymer solution a proppant and a pH control agent suitable to provide a pH of about 8.5 to 13, or about 8.5 to 12.5, or about 8.5 to 12, or about 8.5 to 11.5, or about 8.5 to 11, or about 8.5 to 10.5, or about 8.5 to 10, or about 8.5 to 9.5, or about 8.5 to 9, or about 9 to 10, or about 9 to 9.5, or about 8.5 to 9.5, or about 9.5 to 13, or about 9.5 to 12, or about 10 to 13. The pH control agent is a base. Suitable bases for use in the methods of the invention are not particularly limited and include any chemical species or molecular entity that is soluble in water and has an available pair of electrons capable of forming a covalent bond with a proton (Brønsted base) or with the vacant orbital of some other species (Lewis base). In embodiments the base is an alkali metal hydroxide such as sodium hydroxide, and carbonates are also suitably employed. Other acceptable pH control agents are $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. At temperatures above about 175° F. (79° C.), potassium fluoride (KF) is used to prevent the precipitation of MgO when $Mg(OH)_2$ is used as a base.

In some embodiments, a buffering agent is employed to buffer the injectable solution, such that moderate amounts of either a strong base or acid added to the system—such as inadvertent additions for example—do not cause any large change in pH value of the injectable solution. The buffering agent may be a combination of a weak acid and a salt of the weak acid; an acid salt with a normal salt; or two acid salts. Examples of suitable buffering agents which may be employed to provide a injectable solution having the desired pH value are $NaH_2PO_4$—$Na_2HPO_4$; sodium carbonate-sodium bicarbonate; and sodium bicarbonate, or other like agents. By employing a buffering agent instead of a simple base, an injectable solution is provided which is more stable to a variance of pH values found in local water supplies, to the influence of acidic materials located in formations, and the like.

The proppant employed in hydraulic fracturing is a solid particulate material, typically sand, treated sand or a man-made ceramic material. The proppant is of a size, shape, and hardness suitable for keeping an induced hydraulic fracture open, during or following a hydraulic fracturing process. The proppant is added to the injectable solution in an amount that differs depending on the type of fracturing process employed and the point in the process where the proppant is injected. More viscous injectable solutions are capable of delivering higher amounts of proppant. The amount of proppant is not particularly limited and is variable depending on the injection solution composition as well as the intended use.

Optionally included either in the polymer solution or the injectable solution is a source of dissolved reactive boron. One source of dissolved reactive boron is a compound or blend thereof that liberates dissolved borate oxyanion at alkaline pH. Exemplary compounds which fulfill these requirements are borax, sodium tetraborate and boric acid. Another useful source is Polybor, a product of U.S. Borax Company, which comprises a proprietary composition comprising boric acid and dimers and trimers of borate ions. Various combinations of these borate sources may be used.

Since these compounds rapidly dissolve in the polymer solution or the injectable solution to yield dissolved reactive borate, when adding these compounds to the polymer solution or the injectable solution it is necessary to add an additional aliquot of the competing agent. The competing agent amount is thus increased to provide a total competing agent concentration suitable to delay the crosslinking reaction of all dissolved reactive borate species. The targeted ratios of dissolved reactive borate to competing agent are provided above. If the source of dissolved reactive borate is added to the injectable solution, it is further necessary to add the competing agent contemporaneously with the source of dissolved reactive borate in order to prevent substantially immediate crosslinking and obtain the delayed crosslinking according to the methods of the invention.

Another source of dissolved reactive boron is a sparingly soluble borate, mentioned above. Sparingly soluble borate compounds are those capable of yielding borate ions in an alkaline solution. Sparingly soluble borates such as alkaline earth metal borates, alkali metal alkaline earth metal borates, and combinations thereof are examples of suitable sources. Exemplary minerals which are representative of these broad classes of compounds are as follows:

| | |
|---|---|
| Probertite: | $NaCaB_5O_9 \cdot 5H_2O$ |
| Ulexite: | $CaB_5O_6(OH)_6 \cdot 5H_2O$ |
| Nobleite: | $CaB_6O_{10} \cdot 4H_2O$ |
| Gowerite: | $CaB_6O_{10} \cdot 5H_2O$ |
| Frolovite: | $Ca_2B_4O_8 \cdot 7H_2O$ |
| Colemanite: | $Ca_2B_6O_{11} \cdot 5H_2O$ |
| Meyerhofferite: | $Ca_2B_6O_{11} \cdot 7H_2O$ |
| Inyoite: | $Ca_2B_6O_{11} \cdot 13H_2O$ |
| Priceite: | $Ca_4B_{10}O_{19} \cdot 7H_2O$ |
| Tertschite: | $Ca_4B_{10}O_{19} \cdot 20H_2O$ |
| Ginorite: | $Ca_2B_{14}O_{23} \cdot 8H_2O$ |
| Pinnoite: | $MgB_2O_4 \cdot 3H_2O$ |
| Paternoite: | $MgB_8O_{13} \cdot 4H_2O$ |
| Kurnakovite: | $Mg_2B_6O_{11} \cdot 15H2O$ |
| Inderite: | $Mg_2B_6O_{11} \cdot 15H_2O$ |
| Preobazhenskite: | $Mg_3B_{10}O_{18} \cdot 4\frac{1}{2}H_2O$ |
| Hydroboracite: | $CaMgB_6O_{11} \cdot 6H_2O$ |
| Inderborite: | $CaMgB6O11 \cdot 11H2O$ |
| Kaliborite (Heintzite): | $KMg_2B_{11}O_{19} \cdot 9H_2O$ |
| Veatchite: | $SrB_6O_{10} \cdot 2H_2O$ |

Additional materials suitably added to a polymer solution or an injectable solution of the invention include biocides, surfactants, clay stabilizers, and scale inhibitors. Examples of suitable biocides include Nalco Champion products EC6297A, EC6116A, EC6111A, or EC9555A (available from Nalco Champion of Houston, TX), or a combination of two or more thereof. Biocides are added to the polymer solution or the injectable solution to provide a total concentration of about 200 ppm to 2000 ppm. Examples of suitable surfactants include ST/IFT management agents such as Nalco Champion product FFS100E, wettability agents such as Nalco Champion products 6191X or FFS100E, or non-emulsifying agents such as Nalco Champion products ASP301 or FNE200, and combinations thereof. Surfactants are added to the polymer solution or the injectable solution to provide a total concentration of about 250 ppm to 2000 ppm. Examples of suitable scale inhibitors include phosphonates, phosphate esters polymeric organic acids, or a combination thereof. Scale inhibitors are added to the polymer solution or the injectable solution to provide a total residual concentration of above 10 ppm in the produced water flowing back from the reservoir for about 6 to 18 months. Examples of suitable clay stabilizers include potassium chloride, tetramethyl ammonium chloride, choline chloride, Nalco Champion products ASP425, Clay Safe SA or Product 239, or combinations thereof. Clay stabilizers are added to the polymer solution or the injectable solution to provide a total concentration of about 100 ppm to 2 wt %.

Upon addition of the pH control agent to raise the pH of the polymer solution to about 8.5 to 13 and form the injectable solution, the injectable solution is immediately injected hydraulically into a subterranean reservoir along with the proppant and other additives optionally included as noted above. Hydraulic injection causes the injectable solution to flow into the reservoir, where the delayed crosslinking reaction takes place to achieve mobility control within the reservoir. Further, as the injectable solution becomes crosslinked, proppant is effectively lodged within the fractured rock, thereby allowing for optimal recovery of one or more hydrocarbons flowing from the subterranean reservoir via the propped open fractures.

The crosslinking delay time can be adjusted or fine-tuned in the field during the fracturing without compromising the primary stability factors of the injectable solution. In particular, the crosslinking delay time is suitably adjusted to a period of about 30 seconds to 5 minutes.

The methods of the present invention are usefully employed in situations where the reservoir interior temperature ranges from about 40° C. to about 180° C., though it may be used for any temperatures below 40° C. if desired. Reservoir temperature generally increases with depth. Thus, as the injectable solution is pumped into the reservoir and travels down the wellbore to the subsurface formation to be fractured, it is heated by the increasing temperature gradient as it proceeds. Heating of the injectable solution has the effect of reducing its effective pH. Generally, the target pH for the injectable solution as it is entering the subsurface formation is in the range of about pH=9.5±0.5. To achieve this bottom hole target pH, the injectable solution (for use above 90° C.) typically will have a pH in the range of about pH=12±1 at the surface when it is pumped into the well, depending on the surface temperature, the bottom hole temperature, and the desired bottom hole pH.

A gel breaker is optionally employed to predictably degrade the set gel, i.e., borate-crosslinked polysaccharide, after a predetermined period of time. The gel breakers are generally either enzymes or oxidizing agents. The specific gel breaker employed will depend on the temperature to which the set gel is subjected. Suitable gel breakers include $KBrO_3$ and similar materials, e.g., $KClO_3$, $KIO_3$, peroxides, perborates, persulfates, permanganates (for example, ammonium persulfate, sodium persulfate, and potassium persulfate), sodium bromate, and the like, are used to break the boron-mediated crosslink structure. Suitable enzyme include those that catalyze the hydrolysis of the glycosidic bonds between the monomer units of the polysaccharide. The selection of a suitable enzyme for a particular cis-hydroxylated polymer such as guar or HPG can be determined from references well known to those of skill. The amount of enzyme employed in any particular gel solution as defined herein will depend on the amount of cis-hydroxylated polymer present, and also upon the temperature and pH to which the crosslinked cis-hydroxylated polymer is to be subjected. It is noted, however, that produced water that starts flowing back from the reservoir once hydraulic pressure is released usually has a pH ranging from 6 to 8 which helps break the crosslink junctions, thus aiding in injectable solution recovery.

In the second embodiments of the invention, there is provided an injectable solution comprising a crosslinkable polymer, a competing agent comprising the reaction product of a dialdehyde having 2 to 4 carbon atoms with a non-polymeric cis-hydroxyl compound, and at least one water source. In embodiments, the at least one water source comprises one or more reactive species. In embodiments, the at least one water source comprises, consists of, or consists essentially of a produced water. In the second embodiments of the invention, at least some of the crosslinker is supplied by the water source as one or more reactive species. In embodiments, the one or more reactive species is present as a native species in the produced water and the water source comprises, consists of, or consists essentially of the produced water. In embodiments, the native species in the produced water comprises, consists of, or consists essentially of a reactive boron species. In embodiments, the injectable solution is made by combining the at least one water source comprising one or more reactive species, the crosslinkable polymer, and the competing agent. In the second embodiments, the at least one water source comprises one or more reactive species and is selected from a produced water, tap water, ground water, surface water, seawater, wastewater, deionized water, distilled water, or any combination thereof, with the proviso that the at least one water source comprises one or more reactive species. The terms produced water, tap water, ground water, surface water, seawater, wastewater, deionized water, and distilled water herein are construed to include such water sources having undergone further processing such as adulteration; or purification steps such as, but not limited to, filtration, activated carbon treatment, lime softening, sedimentation, and the like.

In some second embodiments, the injectable solution of the second embodiments is made by combining the at least one water source, the crosslinkable polymer, and a competing agent solution comprising, consisting of, or consisting essentially of the competing agent and one or more competing agent solvents. In embodiments, the one or more competing agent solvents comprises, consists of, or consists essentially of a produced water, tap water, ground water, surface water, seawater, wastewater, deionized water, distilled water, or any combination thereof. In embodiments, the at least one water source comprises, consists of, or consists essentially of a produced water. In some such embodiments, the produced water comprises about 10 ppm to 500 ppm boron as dissolved reactive boron species. In such embodiments, the dissolved reactive boron species is at least one of one or more crosslinkers that crosslinks the crosslinkable polymer.

In embodiments, the injectable solution of the second embodiments is made by combining the at least one water source, the aqueous solution of the crosslinkable polymer, and the competing agent solution.

Third Embodiments

In third embodiments, there is provided a method comprising combining a dialdehyde having 2 to 4 carbon atoms with a non-polymeric cis-hydroxyl compound in an aqueous solution to form a competing agent solution comprising a competing agent; adjusting the pH of the competing agent solution to maintain a pH of about 6.0 to about 6.5; combining a zirconium (IV) compound and an alkanolamine in one or more solvents to form a crosslinker composition comprising a zirconium complex; and maintaining the crosslinker composition at a temperature of between about 35° C.

and 40° C. for 90 to 150 minutes. In embodiments, the crosslinker composition is allowed to cool to ambient temperature.

In embodiments, the method further comprises combining the crosslinker composition and the competing agent solution to form a delayed-crosslinking composition.

In embodiments, the combining the zirconium (IV) compound and the alkanolamine in one or more solvents comprises, consists of, or consists essentially of combining the alkanolamine with a solution of the zirconium (IV) compound in the one or more solvents. In embodiments, the combining in one or more solvents comprises, consists of, or consists essentially of combining the zirconium (IV) complex in a first solvent or first solvent mixture with the alkanolamine in a second solvent or solvent mixture, wherein the one or more solvents consists of or consists essentially of the first solvent or first solvent mixture and the second solvent or solvent mixture. In embodiments, the one or more solvents comprises, consists of, or consists essentially of one or more C1 to C7 alcohols. In embodiments, the one or more solvents comprises, consists of, or consists essentially of n-propanol. In embodiments, the combining is carried out at a temperature from 15° C. to 70° C., in embodiments from 15° C. to 60° C., in embodiments from 15° C. to 50° C., in embodiments from about 15° C. to about 46° C.; in such embodiments, the combining results in an exotherm that warms up the crosslinker composition. The temperature of the crosslinker composition is kept within the aforementioned prescribed limits by cooling the zirconium compound, the alkanolamine, the one or more solvents, the crosslinker composition, or any combination thereof. It can also be achieved by controlling the rate of the combining—the slower the rate, the lower the maximum temperature attained and the lower the temperature not exceeded. In embodiments, the combining in one or more solvents comprises, consists of, or consists essentially of combining the alkanolamine with the zirconium (IV) compound in the one or more solvents to form the crosslinker composition. In such embodiments, an exotherm results, causing the resulting mixture to warm up. In embodiments, the combining comprises, consists of, or consists essentially of adding the alkanolamine to a solution of the zirconium (IV) compound in the one or more solvents. In some such embodiments, the adding is effected at such a rate as to avoid the temperature of the crosslinker composition exceeding 70° C., in embodiments exceeding 60° C., in embodiments exceeding 50° C., in embodiments exceeding about 46° C. In embodiments the alkanolamine comprises, consists of, or consists essentially of triethanolamine. In embodiments, the zirconium (IV) compound is zirconium tetra(n-propoxide). In some such embodiments, the one or more solvents comprises, consists of, or consists essentially of n-propanol. In embodiments, the molar ratio of the zirconium (IV) compound to alkanolamine is between about 1:5 and about 1:11, in embodiments about 1:6 to 1:11, in embodiments about 1:7 to about 1:10, in embodiments about 1:8 to 1:10, in embodiments about 1:9. In some such embodiments, the alkanolamine comprises, consists of, or consists essentially of triethanolamine. In embodiments, after the combining of the zirconium (IV) compound and the alkanolamine in the one or more solvents and after an exotherm resulting from the combining, the method further comprises maintaining the crosslinker composition at a temperature of from about 35° C. to about 40° C. for about 60 minutes to about 200 minutes, in embodiments about 90 to about 150 minutes, in embodiments about 120 minutes.

In embodiments, the non-polymeric cis-hydroxyl compound comprises, consists of, or consists essentially of a sugar alcohol having 3 to 7 carbon atoms selected from erythritol, threitol, pentaerythritol, arabitol, xylitol, ribitol, mannitol, sorbitol, galactitol, fucitol, iditol, inositol, volemitol, glycerol, or a combination thereof. In embodiments, the non-polymeric cis-hydroxyl compound is sorbitol. In embodiments the dialdehyde is selected from glyoxal, maleic dialdehyde, fumaric dialdehyde, glutaric dialdehyde, and the reaction product of glucose with $NaIO_4$. In embodiments, the dialdehyde is glyoxal. In embodiments, the competing agent is the reaction product of the dialdehyde and the non-polymeric cis-hydroxyl compound in a 3:1 to 1:3 molar ratio, in embodiments 2:1 to 1:2 molar ratio, in embodiments about a 1:1 molar ratio. The dialdehyde and the cis-hydroxyl compound are suitably combined in water in about a 3:1 to 1:3 molar ratio, or in about a 2:1 to 1:2 molar ratio, or in about a 1:1 molar ratio to form a combination in water. In embodiments, the combination in water is left mixing for 1-3 hours, in embodiments about 2 hours following the combining the dialdehyde and the non-polymeric cis-hydroxyl compound to form the competing agent. In embodiments, the combination in water is heated to about 60° C. to 100° C. for about 15 minutes to 6 hours to form the competing agent. In embodiments, the combining is carried out in water at a concentration that provides about 40 wt % to 80 wt % of the competing agent at the end of the reaction, for example about 50 wt % to 80 wt %, or about 60 wt % to 80 wt %, or about 40 wt % to 70 wt %, or about 40 wt % to 60 wt % of the competing agent. In some embodiments, the pH of the reaction solution is adjusted to about 6.0 to 6.5, in embodiments 6.0 to 6.1. In other embodiments, the pH is not adjusted. In some embodiments, the pH of the reaction solution decreases as the reaction progresses. In some embodiments, the pH of the reaction product when no pH adjustment is carried out is about 4 to 5.

In embodiments, the method comprises combining the competing agent solution, the crosslinker composition, a water source, and a crosslinkable polymer to form an injectable solution. The order of addition or additions may be varied with the proviso that the competing agent is present when the crosslinker composition or any composition comprising a crosslinker for the crosslinkable polymer is combined with the crosslinkable polymer.

In embodiments, the method comprises combining the competing agent solution and the crosslinker composition to form the delayed-crosslinking composition, and combining the delayed-crosslinking composition with the water source and the dry polymer. In other embodiments, the crosslinkable polymer is dissolved in and/or slurried in a solvent to form a polymer solution, the competing agent solution and the crosslinker composition are combined to form a delayed-crosslinking composition, and the delayed-crosslinking composition and the polymer solution are combined with a water source to form an injectable solution. In some embodiments, the crosslinkable polymer is dissolved and/or slurried in a solvent comprising, consisting of, or consisting essentially of the water source to form a polymer solution. In embodiments, the water source comprises, consists of, or consists essentially of a produced water, tap water, groundwater, surface water, seawater, wastewater, or any combinations thereof. In some such embodiments, the water excludes or substantially excludes one or more reactive species.

Advantageously, the combining the delayed-crosslinking composition with the water source and the crosslinkable polymer to form an injectable solution is effected at a location proximal to a supply or reservoir of the water source (herein, a "location proximal to the water source"). In embodiments the water source is a produced water, and the location proximal to the water source is in the vicinity of an oil recovery site, an oil well, and/or a structure in communication with a subterranean reservoir. In some such embodiments, the crosslinker composition and the competing agent are conveyed from their respective manufacturing locations (which in some embodiments are the same, in other embodiments are different from each other) to the location proximal to the water source, and the method comprises combining the competing agent and the crosslinker composition to form the delayed-crosslinking composition in the location proximal to the water source and combining the delayed-crosslinking composition with the water source and a crosslinkable polymer to form an injectable solution. In other such embodiments, the method comprises combining the competing agent and the crosslinker composition to form the delayed-crosslinking composition, transporting the delayed-crosslinking composition to the location proximal to the water source, and combining the delayed-crosslinking composition with a water source and a crosslinkable polymer to form an injectable solution.

In embodiments, the method of the third embodiments further comprises injecting the injectable solution into a subterranean reservoir; and recovering a hydrocarbon from the reservoir. In embodiments, the hydrocarbon comprises, consists of, or consists essentially of crude oil. In some embodiments, the combining the delayed-crosslinking composition with the water source and the crosslinkable polymer to form an injectable solution is effected batch-wise—that is the combining is completed before the injecting the injectable solution. In other embodiments, the combining the delayed-crosslinking composition with water source and a crosslinkable polymer to form an injectable solution is carried out continuously. In such embodiments, the crosslinkable polymer is first dissolved and/or dispersed in a solvent comprising, consisting of, or consisting essentially of water to form a polymer solution; and the polymer solution, a water source, and the delayed-crosslinking composition are combined in a continuous flow basis, either by combining a flow of the water source and the delayed-crosslinking composition to form a first mixture and then combining a flow of the polymer solution with a flow of the first mixture, or by combining a stream of the water source with a stream of the polymer solution to form a second mixture and then combining a flow of the delayed-crosslinking composition with a flow of the second mixture, or by combining a flow of the delayed-crosslinking composition, a flow of the polymer solution, and a flow of the water source. In some embodiments, the solvent comprises, consists of, or consists essentially of a produced water. In some embodiments, the water source comprises, consists of, or consists essentially of a produced water.

In embodiments, the method comprises injecting the injectable solution immediately after the combining of the delayed-crosslinking composition with the water source and the crosslinkable polymer. In embodiments, the method comprises injecting the injectable solution substantially immediately, in embodiments between 5 seconds and 30 seconds, in embodiments 5 seconds and 60 seconds, or in embodiments 5 seconds and 120 seconds after the combining the delayed-crosslinking composition with the water source.

In embodiments, the method comprises combining the competing agent solution, the polymer, and the water source to form a reactive premix, applying the crosslinker composition to the reactive premix to form an injectable solution, injecting the injectable solution into a subterranean reservoir, and recovering a hydrocarbon from the reservoir. In embodiments, the hydrocarbon is crude oil. In embodiments, the applying the crosslinker composition to the reactive premix to form an injectable solution is effected substantially immediately before the injecting the injectable solution into a subterranean reservoir, in embodiments, between 5 seconds and 60 seconds, in embodiments 5 seconds and 120 seconds before the injecting.

In third embodiments, the molar ratio of the competing agent to zirconium complex is from 1:2 to 1:7, in embodiments from 1:2 to 1:5, in embodiments from 1:3 to 2:9, in embodiments about 1:4, in embodiments 1:3.9.

In embodiments, 30 seconds to 300 seconds after the combining of the delayed-crosslinking composition with the water source and the crosslinkable polymer, the injectable solution reaches a peak viscosity as measured at 100 s$^{-1}$ of about 100 cP to about 10,000 cP at a temperature of between 20° C. and 80° C. In embodiments, 30 seconds to 300 seconds after the combining of the delayed-crosslinking composition with the water source and the crosslinkable polymer, the injectable solution reaches a peak viscosity as measured at 100 s$^{-1}$ of about 1,000 cP to about 1,800 cP at a temperature of between 20° C. and 80° C., in embodiments 60 seconds to 240 seconds, in embodiments 60 seconds to 180 seconds, in embodiments 60 seconds to 150 seconds.

Crosslinking is initiated by combining the crosslinker composition with the crosslinkable polymer. As noted supra, the competing agent of the invention is advantageously present when the crosslinker composition is combined with the polymer so that the competing agent provides a delay to the crosslinking reaction that delays the increase of viscosity of the injectable solution, the delay allowing time for the injectable solution to be injected into a subterranean formation and sufficiently penetrate the formation before a large viscosity increase. Surprisingly, the competing agent provides a suitable delay in crosslinking followed by rheological stability at temperatures above about 150° C. (above 300° F.). Employing the methods of the present invention, the delay period is evidenced by a delay in the onset of viscosity increase of the injectable solution of about 30 seconds to 8 minutes, or about 30 seconds to 7 minutes, or about 30 seconds to 6 minutes, or about 45 seconds to 6 minutes, or about 1 minute to 6 minutes, or about 1 minute 30 seconds to 6 minutes, or about 2 minutes to 6 minutes, or about 2 minutes 30 seconds to 6 minutes, or about 3 minutes to 6 minutes, or about 30 seconds to 5 minutes 30 seconds, or about 30 seconds to 5 minutes, or about 30 seconds to 4 minutes 30 seconds, or about 30 seconds to 4 minutes, or about 30 seconds to 3 minutes 30 seconds, or about 30 seconds to 3 minutes, or about 1 minute to 4 minutes, or about 2 minutes to 4 minutes. Such a delay is sufficient to enable pumping the injectable solution through the injection equipment and associated pipes etc. at a low viscosity.

Viscosity of the injectable solution then increases downhole and/or within the subterranean reservoir, where permeability differences between different areas of the reservoir are advantageously addressed and wherein proppant is advantageously transported into the fractures formed in the rock by the injectable solution during application of hydraulic pressure thereto. Further, conditions within the subterranean reservoir often include temperatures over about 20° C., for example about 30° C. to 200° C. and often about 50° C. to 180° C., for example about 60° C. to 180° C. or about 65° C. to 170° C. For this reason, viscosity measurements in the laboratory are determined over a range of temperatures from about 20° C. to 200° C. in order to more accurately predict initial and peak viscosities of the injectable solutions of the invention in the field.

In embodiments, the peak viscosity of the injectable solution peaks at from about 1000 cP to about 1800 cP when measured at 100 s$^{-1}$ when subject to a temperature increasing from about 20° C. to about 120° C. over a period of about five minutes, as determined by one of skill upon forming an injectable solution. It is an advantage of the methods and compositions of the invention that use the injectable solutions provides substantially the same peak viscosity as would be achieved with the same injectable solution exclusive of the competing agent and injected into the same reservoir, but also to provide a suitable delay.

Fourth Embodiments

In fourth embodiments, there is provided a method of recovering a hydrocarbon from a subterranean reservoir, the method comprising injecting the injectable solution of any of the first embodiments into a subterranean reservoir, and recovering a hydrocarbon from the reservoir. In embodiments, the hydrocarbon is crude oil.

In embodiments, the temperature of the subterranean reservoir is from 15° C. to 200° C., in embodiments 30° C. to 180° C., in embodiments 40° C. to 180° C.

Fifth Embodiments

In fifth embodiments, there is provided a method of making an injectable solution, the method comprising: combining a dialdehyde having 2 to 4 carbons and a non-polymeric cis-hydroxyl compound in an aqueous solution to form a competing agent solution comprising a competing agent; and combining a crosslinkable polymer and the competing agent in a produced water to form the injectable solution, the produced water containing about 10 ppm to 500 ppm boron as dissolved reactive boron species. In some such embodiments, the combining the crosslinkable polymer and the competing agent in the produced water to form the injectable solution comprises, consists of, or consists essentially of combining the crosslinkable polymer and the competing agent solution in the produced water. In such embodiments, the competing agent is combined with the crosslinkable polymer by combining the competing agent solution with the polymer and/or an aqueous solution of the polymer in the produced water. In at least some such embodiments, the injectable solution after the combining has a pH of about 5 to about 7, and the method further comprises adding to the injectable solution having a pH of about 5 to about 7 a pH adjusting agent in an amount sufficient to raise the pH of the injectable solution to about 8.5 to 13. In embodiments, The method further comprises adding to the injectable solution a source of dissolved reactive boron selected from a sparingly soluble borate, boric acid, borate oxyanion, or a combination thereof. In embodiments, the injectable solution reaches a viscosity of at least about 100 cP after about 30 seconds to 5 minutes at 65° C. when measured at 100 s$^{-1}$. In embodiments, the method further comprises injecting the injectable solution into a subterranean reservoir, and recovering a hydrocarbon from the reservoir. In embodiments, the dialdehyde is glyoxal, the non-polymeric cis-hydroxyl compound is sorbitol, and the crosslinkable polymer is selected from guar gum or carboxymethyl hydroxypropyl guar.

In fifth embodiments, there is provided a method of making an injectable solution, the method comprising: combining a dialdehyde having 2 to 4 carbons and a non-polymeric cis-hydroxyl compound in an aqueous solution to form a competing agent solution comprising a competing agent; and combining a crosslinkable polymer and the competing agent in a produced water to form the injectable solution, the produced water containing about 10 ppm to 500 ppm boron as dissolved reactive boron species. In some such embodiments, the combining the crosslinkable polymer and the competing agent in the produced water to form the injectable solution consists essentially of combining the crosslinkable polymer and a delayed-crosslinking composition in the produced water, wherein the method further comprises adjusting the pH of the competing agent solution to maintain a pH of about 6.0 to about 6.5, combining a zirconium tetraalkoxide and an alkanolamine in a solvent to form a crosslinker composition, wherein the combining is carried out at a temperature between about 15° C. and about 46° C. and the molar ratio of zirconium tetraalkoxide to the alkanolamine is about 1:9, maintaining the crosslinker composition at a temperature of from about 35° C. to about 40° C. for 90 to 150 minutes, and combining the competing agent solution and the crosslinker composition to form the delayed-crosslinking composition. In embodiments, the injectable solution reaches a viscosity of from about 100 cP to about 10,000 cP after about 30 seconds to 5 minutes at 163° C. when measured at 100 s$^{-1}$. In embodiments, the method further comprises injecting the injectable solution into a subterranean reservoir, and recovering a hydrocarbon from the reservoir. In embodiments, the dialdehyde is glyoxal, the non-polymeric cis-hydroxyl compound is sorbitol, and the crosslinkable polymer is selected from guar gum or carboxymethyl hydroxypropyl guar.

Further Discussion of the Embodiments

The competing agent of the first, second, third, fourth, or fifth embodiments is the reaction product of a dialdehyde and a non-polymeric cis-hydroxyl compound. Applicants have found that the competing agent advantageously provides a delay in the crosslinking of crosslinkable polymers such as polysaccharides by crosslinkers such as dissolved reactive boron species in a produced water and/or zirconium complexes such as zirconium (IV) triethanolamine complexes. The competing agent can be used in injectable solutions for high temperature applications such as injectable solutions that are subject to temperatures of up to 200° C., for example injectable solutions that penetrate hot subterranean formations having a temperature of up to 200° C. The competing agent can also be used to delay crosslinking in injectable solutions made from produced waters including high-solids produced waters containing various reactive species capable of crosslinking the crosslinkable polymers, reactive species such as borates and multivalent cations.

In the first, second, third, fourth, and fifth embodiments, the competing agent is formed by combining a dialdehyde (such as glyoxal) and a non-polymeric cis-hydroxyl compound (such as sorbitol) to form a mixture excluding or substantially excluding a crosslinker. For example, if glyoxal or another dialdehyde is added to a crosslinker such as a zirconium (IV) triethanolamine complex or a boron crosslinker before reacting the glyoxal with the sorbitol, the dialdehyde such as glyoxal binds to the crosslinker and is less available for reaction with a subsequently added cis-hydroxyl compound such as sorbitol.

The competing agent of the first, second, third, fourth, or fifth embodiments is the reaction product of a dialdehyde and a non-polymeric cis-hydroxyl compound. In embodiments, the dialdehyde is a water soluble dialdehyde. In embodiments, the dialdehyde has 2 to 4 carbons total and 0 to 2 carbons between aldehyde moieties. In embodiments, the dialdehyde is selected from glyoxal, maleic dialdehyde, fumaric dialdehyde, glutaric dialdehyde, and the reaction product of glucose with $NaIO_4$. In embodiments, the dialdehyde is glyoxal. In embodiments, the competing agent is the reaction product of the dialdehyde and the non-polymeric cis-hydroxyl compound in a 3:1 to 1:3 molar ratio, in embodiments 2:1 to 1:2 molar ratio, in embodiments about a 1:1 molar ratio. In embodiments, the dialdehyde and the cis-hydroxyl compound are combined in water in about a 3:1 to 1:3 molar ratio, or in about a 2:1 to 1:2 molar ratio, or in about a 1:1 molar ratio to form a combination in water. In some such embodiments, the combination in water is left for 1-3 hours, in embodiments about 2 hours to form a competing agent solution. In some embodiments, the combination in water is heated to about 60° C. to 100° C. for about 15 minutes to 6 hours to form a competing agent solution. In other embodiments, the combination is mixed and/or left at between about 15° C. and 30° C. for between about one hour to about three hours, in embodiments about two hours. In embodiments, the combining is carried out in water at a concentration that provides about 40 wt % to 80 wt % of the competing agent at the end of the reaction, for example about 50 wt % to 80 wt %, or about 60 wt % to 80 wt %, or about 40 wt % to 70 wt %, or about 40 wt % to 60 wt % of the competing agent. In some embodiments, the pH of the reaction solution is adjusted to about 6.0 to 6.5, in embodiments 6.0-6.1. In other embodiments, the pH is not adjusted. In some embodiments, the pH of the reaction solution decreases as the reaction progresses. In some embodiments, the pH of the reaction product when no pH adjustment is carried out is about 4 to 5.

In some embodiments, the competing agent solution is added along with a crosslinkable polymer to at least one water source to form a polymer solution comprising a competing agent. In other embodiments, the competing agent solution is added to a crosslinker composition to form a delayed-crosslinking composition. The delayed-crosslinking composition is combined with the polymer and the at least one water source or an aqueous solution of the polymer and the at least one water source to form an injectable solution. In still other embodiments, the competing agent solution is added directly to the aqueous solution of the polymer. The competing agent is added to the injectable solution at about 0.01 wt % to 1 wt %, or about 0.05 wt % to 1 wt %, or about 0.1 wt % to 1 wt %, or about 0.01 wt % to 0.9 wt %, or about 0.01 wt % to 0.8 wt %, or about 0.01 wt % to 0.7 wt %, or about 0.01 wt % to 0.6 wt %, or about 0.01 wt % to 0.5 wt %, or about 0.01 wt % to 0.4 wt %, or about 0.01 wt % to 0.3 wt %, or about 0.01 wt % to 0.2 wt %, or about 0.05 wt % to 0.5 wt %, or about 0.1 wt % to 0.5 wt % in the injectable solutions of the invention. Alternatively, the competing agent is added to the injectable solution in a concentration of about $1\times10^{-4}$ M (molar) to about $1\times10^{-6}$ M.

One of skill will appreciate that the amount of competing agent added to the polymer solution is suitably adjusted according to the amount of dissolved reactive species (if any) in the produced water targeted to form the injectable solutions of the invention and the amount of the one or more crosslinkers in the injectable solution.

In embodiments, the non-polymeric cis-hydroxyl compound of the first, second, third, fourth, or fifth embodiments is a water-soluble non-polymeric cis-hydroxyl compound. In embodiments, the non-polymeric cis-hydroxyl compound is a sugar alcohol. In embodiments, the non-polymeric cis-hydroxyl compound is selected from the group consisting of sugar alcohols having 3 to 7 carbons and at least one cis-hydroxyl moiety or cis-hydroxyl oligomers having a molecular weight of less than 10,000 g/mol. In embodiments, the non-polymeric cis-hydroxyl compound comprises, consists of, or consists essentially of a vinyl alcohol head-to-tail oligomer having a weight average molecular weight of about 500 g/mol to 5,000 g/mol. In embodiments, the sugar alcohol having 3 to 7 carbon atoms is selected from erythritol, threitol, pentaerythritol, arabitol, xylitol, ribitol, mannitol, sorbitol, galactitol, fucitol, iditol, inositol, volemitol, glycerol, or any combination thereof. In embodiments, the non-polymeric cis-hydroxyl compound is sorbitol. In embodiments, the non-polymeric cis-hydroxyl compound comprises, consists of, or consists essentially of glycerol.

The crosslinkable polymer of the first, second, third, fourth, or fifth embodiments has a weight average molecular weight of greater than about 10,000 g/mol and up to about 10,000,000 g/mol.

In some embodiments, the crosslinkable polymer of the first, second, third, fourth, or fifth embodiments is a polysaccharide having at least 50 mole % repeat units comprising one or more cis-hydroxyl moieties. A cis-hydroxyl moiety is a pair of hydroxyl groups situated in a configuration such as a 1,2 configuration, wherein the hydroxyls are configured to allow the coordination thereof with the central atom of a coordination complex or crosslinker such as a borate oxyanion. Such configurations include cis-1,2-hydroxy groups on rigid ring structures such as sugars and on unsaturated C=C bonds as well as compounds having freely rotating C—C bonds wherein both carbons bear hydroxyl moieties and wherein rotation of the C—C bond can produce hydroxyls in a substantially eclipsed configuration when viewed as a Newman projection. Collectively, such compounds are denoted cis-hydroxyl compounds.

In other embodiments, the crosslinkable polymer of the first, second, third, fourth, or fifth embodiments is a polysaccharide having less than 50 mole % repeat units comprising one or more cis-hydroxyl moieties.

In embodiments, the crosslinkable polymer has a weight average molecular weight of about 10,000 g/mol to 10,000,000 g/mol, or about 20,000 g/mol to 10,000,000 g/mol, or about 30,000 g/mol to 10,000,000 g/mol, or about 40,000 g/mol to 10,000,000 g/mol, or about 50,000 g/mol to 10,000,000 g/mol, or about 60,000 g/mol to 10,000,000 g/mol, or about 70,000 g/mol to 10,000,000 g/mol, or about 80,000 g/mol to 10,000,000 g/mol, or about 90,000 g/mol to 10,000,000 g/mol, or about 100,000 g/mol to 10,000,000 g/mol, or about 200,000 g/mol to 10,000,000 g/mol, or about 300,000 g/mol to 10,000,000 g/mol, or about 500,000 g/mol to 10,000,000 g/mol, or about 1,000,000 g/mol to 10,000,000 g/mol, or about 20,000 g/mol to 9,000,000 g/mol, or about 20,000 g/mol to 8,000,000 g/mol, or about 20,000 g/mol to 7,000,000 g/mol, or about 20,000 g/mol to 6,000,000 g/mol, or about 20,000 g/mol to 5,000,000 g/mol, or about 20,000 g/mol to 4,000,000 g/mol, or about 20,000 g/mol to 3,000,000 g/mol, or about 20,000 g/mol to 2,000,000 g/mol. In embodiments, the crosslinkable polymer comprises at least 10 mole % repeat units comprising one or more cis-hydroxyl moieties, for example 10 mole % to 100 mole %, or about 20 mole % to 100 mole %, or about 30 mole % to 100 mole %, or about 40 mole % to 100 mole %, or about 50 mole % to 100 mole %, or about 60 mole % to 100 mole %, or about 70 mole % to 100 mole %, or about 80 mole % to 100 mole %, or about 90 mole % to 100 mole %, or substantially 100 mole % repeat units comprising one or more cis-hydroxyl moieties.

In embodiments, the crosslinkable polymer of the first, second, third, fourth, or fifth embodiments comprises, consists of, or consists essentially of a polysaccharide. Herein, the term "polysaccharide" includes not only unfunctionalized polysaccharides such as guar gum, but also functionalized polysaccharides or derivatives of polysaccharides such as carboxymethylguar, hydroxyethylguar, carboxymethyl hydroxyethylguar, hydroxypropylguar (HPG), and carboxymethyl hydroxypropyl guar. In embodiments, the carboxylic groups of carboxymethyl hydroxypropyl guar participate in a crosslinking reaction with the one or more crosslinkers.

In embodiments, the crosslinkable polymer of any of the first, second, third, fourth, or fifth embodiments is selected from guar gum, carboxymethylguar, hydroxyethylguar, carboxymethyl hydroxyethylguar, hydroxypropylguar (HPG), and carboxymethyl hydroxypropyl guar. In embodiments, the crosslinkable polymer of the first, second, third, fourth, or fifth embodiments comprises, consists of, or consists essentially of a guar gum. In embodiments, the crosslinkable polymer of the first, second, third, fourth, or fifth embodiments comprises, consists of, or consists essentially of carboxymethyl hydroxypropyl guar. In some such embodiments, the crosslinkable polymer is the sodium salt of carboxymethyl hydroxypropyl guar.

In embodiments, the crosslinkable polymer comprises, consists of, or consists essentially of one or more galactomannan polymers having a weight average molecular weight of about 50,000 g/mol to 8,000,000 g/mol, or about 100,000 g/mol to 5,000,000 g/mol, or about 1,000,000 g/mol to 3,000,000 g/mol. Galactomannan polymer, as employed herein, refers to those naturally occurring polysaccharides derived from various endosperms of seeds. They are primarily composed of D-mannose and D-galactose units. Examples of some plants producing seeds containing galactomannan gums include tara, huizache, locust bean, palo verde, flame tree, guar bean plant, honey locust, lucerne, Kentucky coffeetree, Japanese pagoda tree, indigo, henna, rattlebox, clover, fenugreek, and soybean. In some embodiments, the polysaccharide is provided in a convenient dry, particulate form generally smaller than what is retained on a No. 20 mesh sieve (U.S. Standard Sieve Series) but larger than that which passes through a No. 200 mesh sieve.

In embodiments, the crosslinkable polymer comprises, consists of, or consists essentially of a guar gum and/or one or more guar derivatives selected from guar gum, locust bean gum, karaya gum, carboxymethylguar, hydroxyethylguar, carboxymethyl hydroxyethyl guar, hydroxypropylguar (HPG), carboxymethyl hydroxypropyl guar, or any combination thereof. Guar is a branched copolymer composed of a mannose backbone with galactose branches; the ratio of mannose to galactose in guar is dependent on and characteristic of the endosperm from which it is derived. The mole ratio of mannose to galactose in guar can range, for example, from 1:1 to more than 3:1. The crosslinkable polymer can comprise cis-1,2 hydroxyl groups and/or carboxymethyl and/or hydroxyalkyl groups that participate in reaction with the crosslinker.

The polysaccharide is generally provided in solid, powder form, or in a hydrocarbon such as diesel or kerosene. When added to a neutral or acidic aqueous solution such as a neutral or acidic water source, the polysaccharide hydrates to form an aqueous solution of the polymer. Hydration of the polysaccharides, e.g., guar or HPG, will only take place under neutral or acidic conditions, that is, at a pH of about 7 or less. Prior to forming the injectable solution, the aqueous solution of the polymer has a viscosity in some embodiments of about 100 cP or less when measured at a shear rate of about 100 s$^{-1}$, for example about 5 cP to 100 cP, or about 10 cP to 100 cP, or about 15 cP to 100 cP, or about 20 cP to 100 cP, or about 25 cP to 100 cP, or about 30 cP to 100 cP, or about 35 cP to 100 cP, or about 40 cP to 100 cP, or about 45 cP to 100 cP, or about 50 cP to 100 cP, or about 5 cP to 95 cP, or about 5 cP to 90 cP, or about 5 cP to 85 cP, or about 5 cP to 80 cP, or about 5 cP to 75 cP, or about 5 cP to 70 cP, or about 5 cP to 65 cP, or about 5 cP to 60 cP, or about 5 cP to 55 cP, or about 5 cP to 50 cP, or about 10 cP to 90 cP, or about 20 cP to 80 cP, or about 30 cP to 80 cP, or about 40 cP to 80 cP, or about 50 cP to 80 cP. One of skill will understand that the viscosity of the polymer solution is selected to meet the requirements of the particular reservoir and equipment employed to apply to the reservoir such polymer solutions and/or injectable solutions formed from them.

The hydration is carried out using standard admixing procedures familiar to one of skill. After the combining, in some embodiments a suitable period of time is provided for hydration and full dissolution of the crosslinkable polymer. A suitable period of hydration is dependent on temperature, pH, ionic content and total dissolved solids of the produced water and the polymer solution, in addition to concentration and molecular weight of the crosslinkable polymer in the polymer solution. The hydration period is sufficient to provide maximum viscosity of the combination, an indication of maximum hydrodynamic volume of the polymer. In some embodiments, hydration of the crosslinkable polymer is achieved in about 30 seconds to about 10 minutes, or about 1 minute to 10 minutes, or about 1 minute to 5 minutes, or about 1 minute to 3 minutes. In some embodiments, agitation of the polymer solution is continued throughout the hydration period.

In embodiments, the amount of crosslinkable polymer in the polymer solution is about 10 ppt (pounds per thousand gallons) to 200 ppt, or about 10 ppt to 180 ppt, or about 10 ppt to 160 ppt, or about 10 ppt to 140 ppt, or about 10 ppt to 120 ppt, or about 10 ppt to 100 ppt, or about 10 ppt to 80 ppt, or about 10 ppt to 60 ppt, or about 10 ppt to 50 ppt, or about 10 ppt to 40 ppt, or about 10 ppt to 30 ppt, or about 10 ppt to 20 ppt, or about 12 ppt to 100 ppt, or about 14 ppt to 100 ppt, or about 16 ppt to 100 ppt, or about 18 ppt to 100 ppt, or about 20 ppt to 100 ppt, or about 15 ppt to 50 ppt, or about 15 ppt to 30 ppt.

In embodiments, the injectable solution of the first, second, third, fourth, or fifth embodiments comprises one or more further additives selected from a proppant, biocide, demulsifier, clay stabilizer, surfactant, gel stabilizer, pH adjusting agent, scale inhibitor, or any combination thereof. Examples of suitable biocides include Nalco Champion products EC6297A, EC6116A, EC6111A, or EC9555A (available from Nalco Champion of Houston, TX), or a combination of two or more thereof. Biocides are added to the polymer solution or the injectable solution to provide a total concentration of about 200 ppm to 2000 ppm. Examples of suitable surfactants include ST/IFT management agents such as Nalco Champion product FFS100E, wettability agents such as Nalco Champion products 6191X or FFS100E, or non-emulsifying agents such as Nalco Champion products ASP301 or FNE200, and combinations thereof. Surfactants are added to the polymer solution or the injectable solution to provide a total concentration of about 250 ppm to 2000 ppm. Examples of suitable scale inhibitors include phosphonates, phosphate esters polymeric organic acids, or a combination thereof. Scale inhibitors are added to the polymer solution or the injectable solution to provide a total residual concentration of above 10 ppm in the produced water flowing back from the reservoir for about 6 to 18 months. Examples of suitable clay stabilizers include potassium chloride, tetramethyl ammonium chloride, choline chloride, Nalco Champion products ASP425, Clay Safe SA or Product 239, or combinations thereof. Clay stabilizers are added to the polymer solution or the injectable solution to provide a total concentration of about 100 ppm to 2 wt %.

Useful pH control agents include bases. Suitable bases for use in the methods of the invention are not particularly limited and include any chemical species or molecular entity that is soluble in water and has an available pair of electrons capable of forming a covalent bond with a proton (Bronsted base) or with the vacant orbital of some other species (Lewis base). In embodiments the base is selected from an alkali metal hydroxide, an alkali metal carbonate, or a mixture thereof. Other possible pH control agents are $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. At temperatures above about 175° F. (79° C.), potassium fluoride is used to prevent the precipitation of MgO when $Mg(OH)_2$ is used as a base.

In some embodiments, a buffering agent is employed to buffer the injectable solution, such that moderate amounts of either a strong base or acid added to the system - such as inadvertent additions for example - do not cause any large change in pH value of the injectable solution. The buffering agent may be a combination of a weak acid and a salt of the weak acid; an acid salt with a normal salt; or two acid salts. Examples of suitable buffering agents which may be employed to provide an injectable solution having the desired pH value are $NaH_2PO_4$—$Na_2HPO_4$; sodium carbonate-sodium bicarbonate; and sodium bicarbonate, or other like agents. By employing a buffering agent instead of a simple base, an injectable solution is provided which is more stable to a variance of pH values found in local water supplies, to the influence of acidic materials located in formations, and the like.

In embodiments, the injectable solutions of the first, second, third, fourth, or fifth embodiments comprises one or more proppants. A proppant employed in hydraulic fracturing is a solid particulate material, typically sand, treated sand, or a man-made ceramic material. The proppant is of a size, shape, and hardness suitable for keeping an induced hydraulic fracture open during or following a hydraulic fracturing process. The proppant is added to the injectable solution in an amount that differs depending on the type of fracturing process employed and the point in the process where the proppant is injected. More viscous injectable solutions are capable of delivering higher amounts of proppant. The amount of proppant is not particularly limited and is variable depending on the injection solution composition as well as the intended use. In embodiments, the injectable solution further comprises one or more additional components selected from a gel breaker, a demulsifier, a clay stabilizer, a biocide, a scale inhibitor, one or more surfactants, a pH adjuster, or a mixture of two or more thereof.

In embodiments, the injectable solutions of the first, second, third, fourth, or fifth embodiments comprise a gel breaker. The gel breaker is optionally employed to predictably degrade the set gel, i.e., the crosslinked polysaccharide, after a predetermined period of time. The gel breakers are generally either enzymes or oxidizing agents. The specific gel breaker employed will depend on the temperature to which the set gel is subjected. Suitable gel breakers include $KBrO_3$ and similar materials, e.g., $KClO_3$, $KIO_3$, peroxides, perborates, persulfates, permanganates (for example, ammonium persulfate, sodium persulfate, and potassium persulfate), sodium bromate, and the like, are used to break the boron-mediated crosslink structure. Suitable enzymes include those that catalyze the hydrolysis of the glycosidic bonds between the monomer units of the polysaccharide. The selection of a suitable enzyme for a particular crosslinkable polymer such as guar or HPG can be determined from references well known to those of skill. The amount of enzyme employed in any particular gel solution as defined herein will depend on the amount of crosslinkable polymer present, and also upon the temperature and pH to which the crosslinked crosslinkable polymer is to be subjected. It is noted, however, that produced water that starts flowing back from the reservoir once hydraulic pressure is released usually has a pH ranging from 6 to 8 which helps break the crosslink junctions, thus aiding in injectable solution recovery.

Produced Water

In embodiments, any of the water sources of the first, second, third, fourth, and fifth embodiments comprises, consists of, or consists essentially of a produced water. In some first, second, third, fourth, or fifth embodiments, the water sources usefully addressed by the methods of the present invention include those sources having at least 10 ppm elemental boron. Concentrations of boron in surface water range widely; however, average boron concentrations in surface water sources are typically well below 0.6 ppm in most regions of the world. In sharp contrast, produced water often includes 10 ppm or more of elemental boron. As will be appreciated, water sources containing dissolved reactive species such as produced waters containing dissolved reactive boron are particularly important for the second embodiments, wherein the crosslinker is solely provided by the water source.

In embodiments, the water sources include about 10 ppm to 500 ppm elemental boron present in the water source as dissolved reactive boron species, or about 12 ppm to 500 ppm, or about 14 ppm to 500 ppm, or about 16 ppm to 500 ppm, or about 18 ppm to 500 ppm, or about 20 ppm to 500 ppm, or about 25 ppm to 500 ppm, or about 30 ppm to 500 ppm, or about 35 ppm to 500 ppm, or about 40 ppm to 500 ppm, or about 45 ppm to 500 ppm, or about 50 ppm to 500 ppm, or about 55 ppm to 500 ppm, or about 60 ppm to 500 ppm, or about 65 ppm to 500 ppm, or about 70 ppm to 500 ppm, or about 75 ppm to 500 ppm, or about 80 ppm to 500 ppm, or about 85 ppm to 500 ppm, or about 90 ppm to 500 ppm, or about 95 ppm to 500 ppm, or about 100 ppm to 500 ppm, or about 110 ppm to 500 ppm, or about 120 ppm to 500 ppm, or about 130 ppm to 500 ppm, or about 140 ppm to 500 ppm, or about 150 ppm to 500 ppm, or about 175 ppm to 500 ppm, or about 200 ppm to 500 ppm, or about 250 ppm to 500 ppm, or about 300 ppm to 500 ppm, or about 350 ppm to 500 ppm, or about 400 ppm to 500 ppm, or about 450 ppm to 500 ppm, or about 10 ppm to 400 ppm, or about 10 ppm to 350 ppm, or about 10 ppm to 300 ppm, or about 10 ppm to 250 ppm, or about 10 ppm to 200 ppm, or about 10 ppm to 150 ppm, or about 10 ppm to 140 ppm, or about 10 ppm to 130 ppm, or about 10 ppm to 120 ppm, or about 10 ppm to 110 ppm, or about 10 ppm to 100 ppm, or about 20 ppm to 300 ppm, or about 20 ppm to 200 ppm, or about 20 ppm to 150 ppm, or about 20 ppm to 120 ppm elemental boron, present as dissolved reactive boron species.

Produced water often has a total dissolved solids content at least about 1 wt %, and up to about 35 wt %. The dissolved solids include various ions. Table 1 (supra) shows representative analyses of some cations as well as chloride anion present in a sample of produced water obtained from the Permian Basin region of the United States, as measured by inductively coupled plasma (ICP) analysis or titration in the case of chloride anion. While these measurements are not a total analysis, one of skill will appreciate that in addition to dissolved boron species, large concentrations of ions, such as sodium, calcium, magnesium, and other divalent cations cause solution instability when injectable solutions are formed using produced water. Instability is evidenced by formation of gel particles, coagulum, polymer coated out on contact surfaces, and the like. The products of this instability cause plugged equipment in the field, reduced reservoir permeability, plugged formation, and ultimately failure to accomplish mobility control within the reservoir. Further, some ions present in the produced water, such as iron, are also capable of ionic or coordination reactions with crosslinkable polymers such as guar gum, 2-carboxymethyl hydroxypropyl guar, and cis-hydroxylated compounds. The presence of such ions further complicates attempts to use produced water to provide delayed crosslinking of the crosslinkable polymer. It is a feature of the invention that the injectable solutions formed according to the invention do not suffer from instability in the presence of the various ions, including those that can react with cis-hydroxylated compounds. It is a feature of the invention that when the competing agent is included in an injectable solution formed using produced water, observable crosslinking of crosslinkable polymers, manifested as an increase in viscosity, is delayed for at least 30 seconds and as long as 5 minutes.

In some second embodiments of the invention, the pH of the water source employed in forming the polymer solution is or is adjusted to be about 5 to 8, or about 5.1 to 8, or about 5.2 to 8, or about 5.3 to 8, or about 5.4 to 8, or about 5.5 to 8, or about 5.6 to 8, or about 5.7 to 8, or about 5.8 to 8, or about 5.9 to 8, or about 6.0 to 8, or about 6.1 to 8, or about 6.2 to 8, or about 6.3 to 8, or about 6.4 to 8, or about 6.5 to 8, or about 5 to 7.9, or about 5 to 7.8, or about 5 to 7.6, or about 5 to 7.4, or about 5 to 7.2, or about 5 to 7.0, or about 5 to 6.9, or about 5 to 6.8, or about 5 to 6.7, or about 5 to 6.6, or about 5 to 6.5, or about 5 to 6.4, or about 5 to 6.3, or about 5 to 6.2, or about 5 to 6.1, or about 5 to 6.0, or about 5 to 5.9, or about 5 to 5.8, or about 5 to 5.7, or about 5 to 5.6, or about 5 to 5.5, or about 5 to 5.4, or about 5 to 5.3, or about 5.5 to 7, or about 5.5 to 6.5. In some such second embodiments, the water source employed to form the polymer solution has a pH within the suitable range, and no adjustment of pH is carried out prior to forming a polymer solution from the water source. In other second embodiments, the pH is lower than 5 or higher than 8 and adjustment is necessary to provide pH in a suitable range for polymer solution formation. In some second embodiments, a water source having a pH of less than 5 is acceptable to use in forming the polymer solution, since the low pH prevents substantial crosslinking by the dissolved reactive boron species. However, in other second embodiments use of water source having a pH of less than about 5 is impractical due to the amount of pH adjustment agent required in order to increase the pH to 8.5 or greater during formation of the injectable solution, lowered solubility of the crosslinkable polymer, or both. Thus in the second embodiments, where pH of the water source is less than about 5, it is a selection of the user to adjust the pH to 5 or greater or simply use the water source without adjusting the pH prior to forming the polymer solution.

Agents employed to adjust the pH of the water source to about 5 from below about 5 are bases. Suitable bases for use in the methods of the invention are not particularly limited and include any chemical species or molecular entity that is soluble in water and has an available pair of electrons capable of forming a covalent bond with a proton (Bronsted base) or with the vacant orbital of some other species (Lewis base). Commonly employed bases include sodium, potassium, or calcium hydroxide. Agents employed to adjust the pH of the water source to about 6.5 or less starting from a pH above about 6.5 are acids. Suitable acids for use in the methods of the invention are not particularly limited and include any chemical species or molecular entity that is soluble in water and capable of donating a proton (Bronsted acid) or capable of forming a covalent bond with an electron pair (Lewis acid). Commonly employed acids include sulfonic acid, phosphoric acid, hydrochloric acid, organic acids such as citric acid or acetic acid, sulfamic acid, and nitric acid. The amount of acid or base is not limited and are added in a suitable amount to reach the target pH, as will be understood by those of skill.

Further Description of Embodiments

In embodiments, there is provided a composition comprising a produced water having about 10 ppm to 500 ppm boron present as dissolved reactive boron species; a polymer having cis-hydroxyl functionality; and a competing agent comprising a product obtained by heating an aqueous solution of a dialdehyde having 2 to 4 carbons and a sugar alcohol having 4 to 7 carbons. In embodiments, the dialdehyde is glyoxal. In embodiments, the sugar alcohol is sorbitol. In embodiments, the polymer is a polysaccharide. In embodiments, the polysaccharide is guar. In embodiments, the composition further comprises a source of dissolved reactive boron. In some such embodiments, the source of dissolved reactive boron is a sparingly soluble borate, boric acid, borate oxyanion, or a combination two or more thereof In embodiments, the molar ratio of dissolved reactive boron species to competing agent in the composition is about 5:1 to 1:20. In some embodiments the pH of the composition is about 5 to 7, in other embodiments the pH of the composition is about 8.5 to 13. In embodiments, the produced water comprises a total dissolved solids content of about 1 wt % to 35 wt %. In embodiments, the composition further comprises a gel breaker.

In embodiments, there is provided a method of recovering a hydrocarbon from a subterranean reservoir, the method comprising: combining a dialdehyde having 2 to 4 carbons and a sugar alcohol having 4 to 7 carbons in an aqueous solution and heating the solution to form a competing agent; combining a cis-hydroxylated polymer and the competing agent in a produced water, the produced water containing about 10 ppm to 500 ppm boron as dissolved reactive boron species, to form a polymer solution wherein the pH of the polymer solution is about 5 to 7; adding a pH adjusting agent in an amount sufficient to raise the pH of the polymer solution to about 8.5 to 13 to form an injectable solution; injecting the injectable solution into the subterranean reservoir; and recovering a hydrocarbon from the reservoir. In embodiments, the dialdehyde and the sugar alcohol are combined in about a 3:1 to 1:3 molar ratio. In embodiments, the method of claim 13 wherein the aqueous solution is heated to about 60° C. to 100° C. for about 15 minutes to 6 hours prior to combining with the cis-hydroxylated polymer. In embodiments, the method of claim 13 further comprising adding a source of dissolved reactive boron to the polymer solution. In embodiments, the source of dissolved reactive boron comprises a sparingly soluble borate, boric acid, borate oxyanion, or a combination thereof. In some embodiments of the method, the injectable solution reaches a viscosity of at least about 100 cP after about 30 seconds to 5 minutes at 65° C. when measured at 100 s$^{-1}$. In embodiments, an interior of the subterranean reservoir comprises a temperature of about 40° C. to 180° C. In embodiments, the method of claim 13 further comprising adding one or more proppants to the injectable solution prior to the injecting.

In embodiments, there is provided an injectable solution comprising a crosslinkable polymer; a competing agent comprising a reaction product of a dialdehyde having 2 to 4 carbon atoms with a non-polymeric cis-hydroxyl compound; a crosslinker composition; and at least one water source. In embodiments, the crosslinker composition comprises, consists of, or consists essentially of a zirconium complex. In some such embodiments, the crosslinker composition comprises, consists of, or consists essentially of the product obtained by mixing a solution of a zirconium (IV) compound and an alkanolamine composition comprising an alkanolamine, wherein the molar ratio of the zirconium (IV) compound to the alkanolamine is between 1:5 and 1:10, in embodiments about 1:9. In embodiments, the alkanolamine is triethanolamine. In embodiments, the zirconium (IV) compound is zirconium tetra(n-propoxide). In embodiments, the alkanolamine composition consists essentially of the alkanolamine. In embodiments, the crosslinker composition comprises a C1 to C7 alcohol. In some such embodiments, the C1 to C7 alcohol is n-propanol. In embodiments, the at least one water source comprises, consists of, or consists essentially of a a produced water, tap water, groundwater, surface water, seawater, wastewater, or any combination thereof. In embodiments, the produced water comprises a total dissolved solids content of about 1 wt % to 35 wt %. In embodiments, the dialdehyde is selected from glyoxal, maleic dialdehyde, fumaric dialdehyde, glutaric dialdehyde, the reaction product of glucose with NaIO$_4$, or combinations thereof In embodiments, the dialdehyde is glyoxal. In embodiments, the non-polymeric cis-hydroxyl compound is a C3 to C7 sugar alcohol selected from erythritol, threitol, pentaerythritol, arabitol, xylitol, ribitol, mannitol, sorbitol, galactitol, fucitol, iditol, inositol, volemitol, glycerol, or any combination thereof. In embodiments, the non-polymeric cis-hydroxyl compound is sorbitol. In embodiments, the crosslinkable polymer is a polysaccharide. In embodiments, the polymer is carboxymethyl hydroxypropyl guar. In embodiments, the molar ratio of the zirconium complex to the competing agent in the crosslinker composition is about 5:1 to about 1:20. In embodiments, the injectable solution further comprises additional component selected from a gel breaker, a demulsifier, a clay stabilizer, a biocide, a scale inhibitor, one or more surfactants, a pH adjuster, or a mixture of two or more thereof. In embodiments, the dialdehyde and the non-polymeric cis-hydroxyl compound are in about a 3:1 to 1:3 molar ratio.

In embodiments, there is provided a method comprising: combining a dialdehyde having 2 to 4 carbon atoms with a non-polymeric cis-hydroxyl compound in an aqueous solution to form a competing agent solution comprising a competing agent; adjusting the pH of the competing agent solution to maintain a pH of about 6.0 to about 6.5; combining a zirconium (IV) compound and an alkanolamine in one or more solvents to form a crosslinker composition comprising a zirconium complex; maintaining the crosslinker composition at a temperature of from about 35° C. to about 40° C. for 90 to 150 minutes; and combining the competing agent solution and the crosslinker composition to form a delayed-crosslinking composition. In embodiments, the method of claim 21, wherein the molar ratio of the competing agent to zirconium complex is from 1:3 to 2:9, in embodiments about 1:4. In embodiments, the one or more solvents consists of one or more C1 to C7 alcohols. In some such embodiments, the one or more solvents consists essentially of n-propanol. In embodiments, the alkanolamine is triethanolamine. In embodiments, the zirconium (IV) compound is zirconium tetra(n-propoxide). In embodiments, the dialdehyde is glyoxal. In embodiments, the non-polymeric cis-hydroxyl compound is sorbitol. In embodiments, the combining the zirconium (IV) compound and the alkanolamine in the one or more solvents is carried out at a temperature between about 15° C. and about 46° C. In embodiments, the maintaining is at a temperature of about 38° C. In embodiments, the method further comprises combining the delayed-crosslinking composition with a water source and a crosslinkable polymer to form an injectable solution; injecting the injectable solution into a subterranean reservoir; and recovering a hydrocarbon from the reservoir. In embodiments, the injectable solution comprises a produced water.

In embodiments, there is provided a method of recovering a hydrocarbon from a subterranean reservoir, the method comprising: injecting the injectable solution of any one of claims 1-20 into a subterranean reservoir; and recovering a hydrocarbon from the reservoir. In embodiments, the injectable solution reaches a viscosity of from about 100 cP to about 10,000 cP after about 30 seconds to 5 minutes at 163° C. when measured at 100 s$^{-1}$. In embodiments, an interior of the subterranean reservoir is at a temperature of about 40° C. to 180° C. In embodiments, the method further comprises adding one or more proppants to the injectable solutions described prior to the injecting.

In embodiments, there is provided a use of any one or more of the injectable solutions described herein to recover a hydrocarbon mixture from a subterranean reservoir.

EXAMPLES

Example 1

Thirty-five (35) parts of a 40 wt % glyoxal solution was added to 65 parts of a 70 wt % sorbitol solution, and pH was adjusted to between 6.00 and 6.10 with a 50 wt % solution of NaOH. Once the pH was stabilized the solution was heated to 82° C. for 2 hours. The solution was stirred throughout this period. The pH dropped during the course of the reaction to approximately 4.2 and was used as is. (For storage purposes, it is also possible to adjust the pH to about 6 after the reaction is complete.)

Example 2

The procedure of Example 1 was repeated, but employing a xylitol solution instead of the sorbitol solution, further wherein the amount of xylitol contacted with the glyoxal solution was adjusted to provide the same molar ratio of xylitol:glyoxal as used for sorbitol:glyoxal in Example 1.

Examples 3-11

A sample of synthetic produced Permian Basin water was obtained and used at ambient temperature to form a series of guar slurries at pH of about 6.5 to 7, wherein the solutions further include a competing agent of Examples 1 or 2 or a comparative compound having cis-hydroxyls in aqueous solution. The polymer solutions were formed using amounts of these materials that result in the concentrations indicated in Table 2 after further addition of borax and 20 wt % NaOH to the polymer solutions; this amount is termed the target amount, as shown in Table 2.

The procedure used to form the polymer solutions of Table 2 is as follows. First, 500 mL of a synthetic produced water is added to a Chandler Constant Speed Blender Model 3060-110V with 1 Liter glass blender jar (obtained from Chandler Engineering of Broken Arrow, Okla.). The blender is set at 1500 RPM. A competing agent (of Ex. 1 or 2) or comparative compound is added in the target amount indicated in Table 2. Then pH is adjusted if necessary to between 6.50 and 7.00 using a 7 wt % HCl solution or a 20 wt % NaOH solution. Then 1.8 wt % guar (POLYfrac PLUS M, obtained from NP Industries of Houston, Tex.) added and a timer started. After 2.5 minutes, the blender is shut off and the polymer solution is added to an OFITE Model 900 Viscometer (obtained from OFI Testing Equipment, Inc. of Houston, TX) fitted with an R1 rotor and B1 bob. Base viscosity of the polymer solution is determined at about 20° C. to 25° C. and at 300 RPM. Viscosities of the polymer solutions are listed in Table 2.

TABLE 2

Competing agent of Examples 1 or 2 or a comparative material, added to guar slurry at pH of 7 or less, and resulting viscosity.

| Ex. No. | Ex. 1 compound | Ex. 2 compound | Sorbitol | Glyoxal | Xylitol | Viscosity, cP |
|---|---|---|---|---|---|---|
| | | ppm, target | | | | |
| 3 | 1325 | | | | | 10.3 |
| 4 | 1514 | | | | | 9.9 |
| 5 | | | 1689 | | | 11.1 |
| 6 | | | 1819 | | | 11.2 |
| 7* | | | | 2227 | | 11.4 |
| 8* | | | 1485 | | | 11.5 |
| 9* | | | 1113 | | | 10.6 |
| 10 | | | | | 2221 | 10.9 |
| 11 | | 1325 | | | | |
| 12 | | 1514 | | | | |

[*pH unstable, dropped throughout the test]

Notably, the concentration of the competing agent or comparative compound in all Examples were adjusted to provide about the same boron:hydroxyl molar ratio in an injectable solution, assuming a consistent concentration of boron is present in each injectable solution. Due to pH instability, Examples 7, 8, and 9 were not tested further.

Example 13

The polymer solutions of Examples 3, 5, 6, 10, and 11 were subjected to crosslinking conditions. First, a crosslinker composition was formed by blending 24 wt % sodium borate decahydrate ("borax"), 4.9 wt % glycerol, 10 wt % of a 50 wt % NaOH solution in water, and 53.1 wt % water to form a solution. Then crosslinking was carried out as follows.

A polymer solution as noted above is added to a Chandler Constant Speed Blender Model 3060-110V with 1 Liter glass blender jar (obtained from Chandler Engineering of Broken Arrow, Okla.). The blender is set at 1500 RPM. Then 0.2 wt % of a 20 wt % NaOH solution is added to the blender and a timer is started. The crosslinker composition is added in an amount targeted to provide 68.74 ppm boron to the polymer solution. When the timer reaches 30 seconds, the blender is shut off and the mixture is added to an Chandler Model 5550 High Temperature, High Pressure Rheometer (obtained from Chandler Engineering of Broken Arrow, Okla.) fitted with an R1 rotor and B5 bob. Viscosity as a function of time is determined at 100 s$^{-1}$. The temperature during the measurement is raised from ambient (about 20° C. to 25° C.) to 65° C. over about 8-12 minutes.

Results of employing this procedure for the polymer solutions of Examples 3, 5, 6, 10, and 12 are shown in FIG. 1. An inspection of FIG. 1 reveals that the mixture of Examples 3 and 12 exhibited a delayed crosslinking time such that suitable viscosity for fluid mobility control (100 cP at 100 s$^{-1}$) was reached after at least about 90 seconds. The mixture of Example 5 exhibited substantially no delay, while the mixtures of Examples 6 and 10 had a delay time of less than about 20 seconds.

Example 14

A round-bottom flask was charged with a 40% by weight solution of glyoxal in water (amounts given in Table 3), and mixing was started. To the glyoxal solution in the flask was added a 70% by weight solution of sorbitol in water (amounts given in Table 3), and the contents of the flask were mixed until homogenous. The pH of the solution in the flask was monitored. To the contents of the flask was added aqueous sodium hydroxide (50% by weight solution in water) to raise the pH of the liquid to between 6.0 and 6.1. The solution was stirred for a further two hours at room temperature.

TABLE 3

| Competing agent solutions | | | | |
|---|---|---|---|---|
| Competing Agent Solution | Amount of 40% glyoxal/gram | Amount of 70% sorbitol/gram | Amount of 50% sodium hydroxide/gram | Approximate mole ratio of glyoxal:sorbitol |
| A | 131.99 | 246.62 | 0.50 | 1:1 |
| B | 290.20 | 260.24 | 1.00 | 2:1 |
| C | 145.10 | 520.49 | 2.18 | 1:2 |

Example 15

A 500 ml round-bottom flask was charged with 117 grams of a 70% by weight solution of zirconium tetra(n-propoxide) in n-propanol, and mixing was started. The temperature of the contents of the flask was continuously monitored. To the zirconium tetra(n-propoxide) solution was added dropwise triethanolamine to control the exotherm. The triethanolamine was added over approximately 35 minutes and the maximum temperature attained was about 46° C. (115° F.). The contents of the flask were stirred for a further approximately 85 minutes giving a total reaction time of about 120 minutes. During this 85 minute-period, the contents were allowed to cool to about 38° C. (100° F.) and were maintained at this temperature for the remainder of the 85 minute period by heating. The contents were then cooled to room temperature to yield the crosslinker solution.

Example 16

Each competing agent solution (2 mL) from EXAMPLE 14 was individually mixed with a portion of the crosslinker solution from EXAMPLE 15 to give an composition, as shown in Table 4:

TABLE 4

Delayed-crosslinking compositions

| Delayed-crosslinking composition | Competing agent solution | Crosslinker solution |
|---|---|---|
| D | 2 mL of competing agent solution A | 35 mL of crosslinker solution |
| E | 2 mL of competing agent solution B | 35 mL of crosslinker solution |
| F | 2 mL of competing agent solution C | 35 mL of crosslinker solution |

Example 17: Injectable Solutions' Viscosity Measurements

Each of six injectable solutions was made up by mixing water, 45 pounds per thousand gallons of carboxymethyl hydroxypropyl guar, one gallon per thousand gallons of a demulsifier, one gallon per thousand gallons of a clay stabilizer choline chloride), half a gallon per thousand gallons of a biocide, half a gallon per thousand gallons of a scale inhibitor, half a gallon per thousand gallons of a nonionic surfactant, eight gallons per thousand gallons of a gel stabilizer, three gallons per thousand gallons of aqueous sodium hydroxide (20% by weight solution of sodium hydroxide in water), and either 1.1 or 1.2 gallons per thousand gallons of compositions D, E, or F (from Example 3), as shown in Table 5:

TABLE 5

Injectable solutions

| Injectable solution | Water used | Delayed-crosslinking composition | Gallons of delayed-crosslinking composition added per thousand gallons |
|---|---|---|---|
| G | Tap water, Fresno, TX | D | 1.1 |
| H | Tap water, Fresno, TX | D | 1.2 |
| I | Tap water, Fresno, TX | D | 1.2 |
| J | Tap water, Fresno, TX | D | 1.1 |
| K | Tap water, Fresno, TX | E | 1.1 |
| L | Tap water, Fresno, TX | F | 1.1 |

Each of the six injectable solutions was heated to 163° C. (325° F.) at a pressure of 400 psi and the viscosity measured at 100 s$^{-1}$ using a Chandler Engineering Model 5550 Rheometer available from Chandler Engineering, Tulsa, Okla. over a period of approximately two hours thirty minutes.

Figure 2:
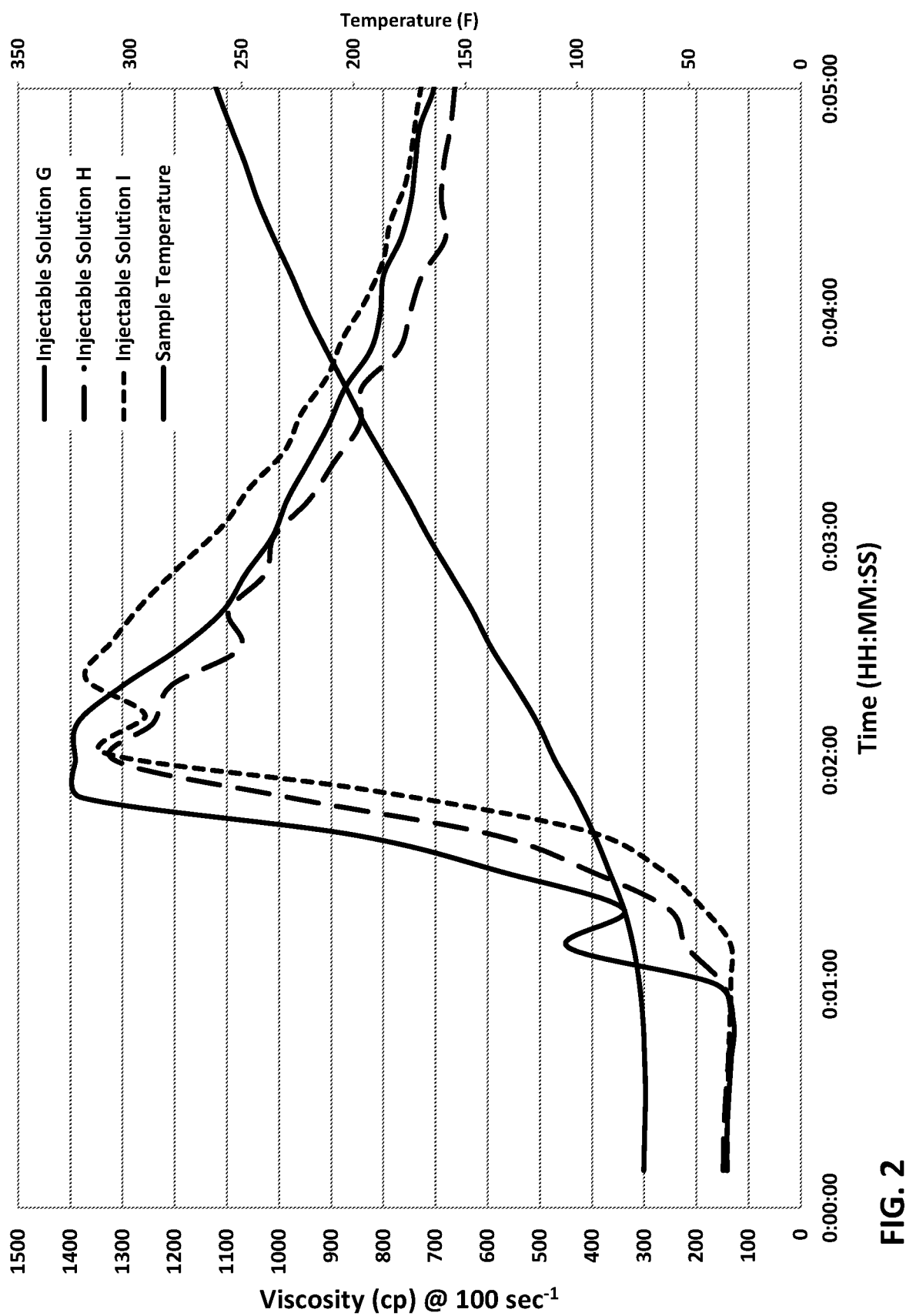
FIG. 2 is a plot of viscosity as a function of time for three injectable solutions.
Figure 3:
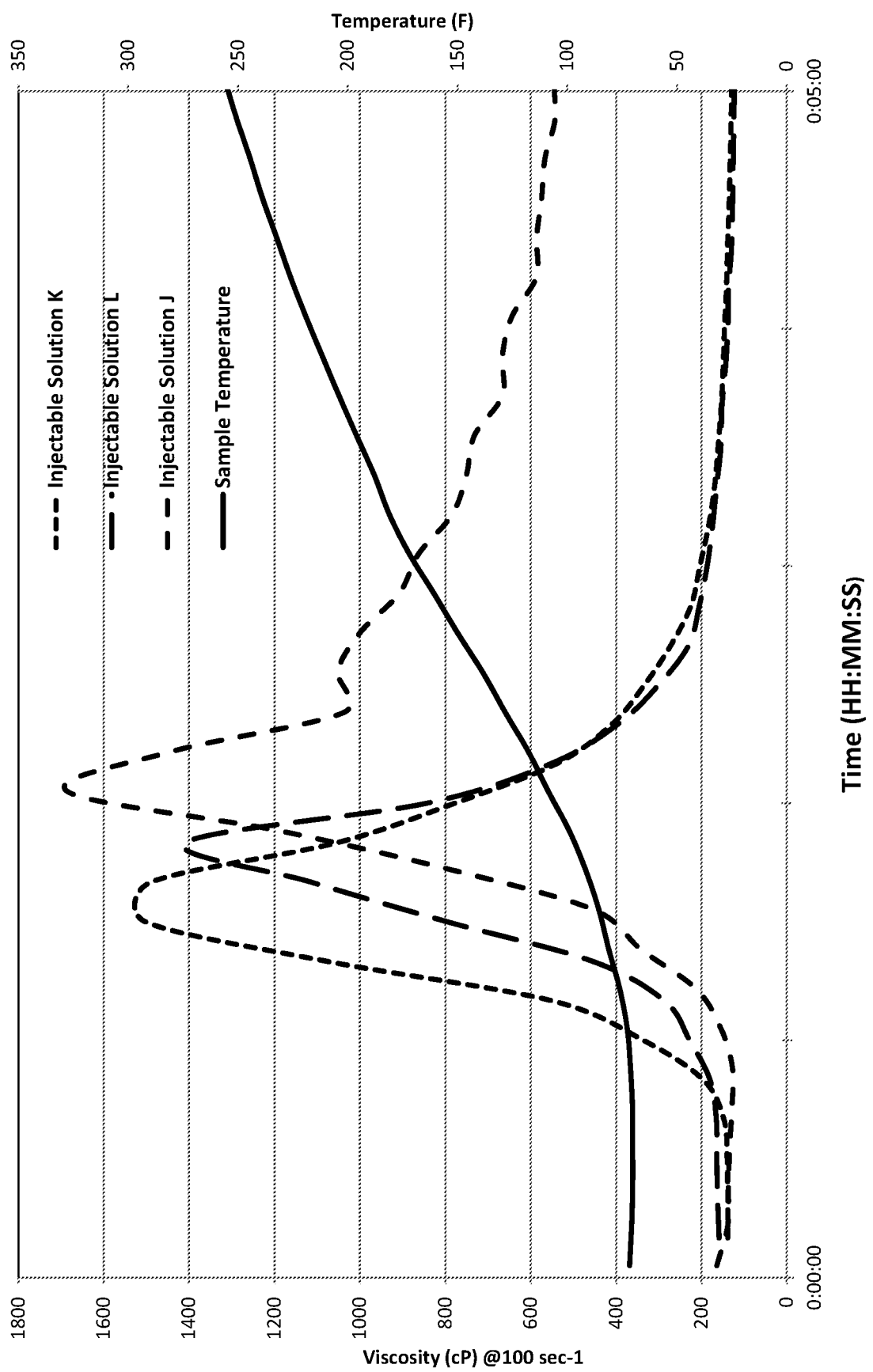
FIG. 3 is a plot of viscosity as a function of time for a further three injectable solutions.

Plots of the viscosity of injectable solutions G, H, and I are shown in FIG. 2; and plots of the viscosity of injectable solutions J, K, and L are shown in FIG. 3.

As exhibited by the plots of FIGS. 2-3, the viscosity of the injectable solutions advantageously increased after a delay to a maximum (peak) of between 1200 and 1800 cP (at 100 s$^{-1}$), then decreased. After the initial viscosity increase and peak, injectable solutions G, H, I, J, K, and L each maintained a viscosity in excess of 80cP for at least 120 minutes at about 162.5° C. (about 325° F.).

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A method of making an injectable solution, the method comprising:
    reacting a dialdehyde having 2 to 4 carbons and a non-polymeric cis-hydroxyl compound in an aqueous solution to form a competing agent solution comprising a competing agent and excluding a borate; and
    combining a crosslinkable polymer and the competing agent solution in produced water to form the injectable solution, the produced water containing about 10 ppm to 500 ppm boron as dissolved reactive boron species.

2. The method of claim 1, further comprising injecting the injectable solution into the subterranean reservoir, and recovering a hydrocarbon from the reservoir.

3. The method of claim 1, wherein the dialdehyde is glyoxal, the non-polymeric cis-hydroxyl compound is sorbitol, and the crosslinkable polymer is selected from guar gum or carboxymethyl hydroxypropyl guar.

4. The method of claim 1, wherein the combining the crosslinkable polymer and the competing agent in produced water consists essentially of combining the crosslinkable polymer and the competing agent solution solution in produced water, wherein the injectable solution after the combining has a pH of about 5 to about 7, and wherein the method further comprises adding to the injectable solution having a pH of about 5 to about 7 a pH adjusting agent in an amount sufficient to raise the pH of the injectable solution to about 8.5 to 13.

5. The method of claim 4, further comprising adding to the injectable solution a source of dissolved reactive boron selected from a sparingly soluble borate, boric acid, borate oxyanion, or a combination thereof.

6. The method of claim 4, wherein about 30 seconds to 5 minutes after the combining the crosslinkable polymer and the competing agent solution in the produced water, the injectable solution reaches a viscosity of at least about 100 cP at 65° C. when measured at 100 s$^{-1}$.

7. The method of claim 1, wherein the method further comprises:
    adjusting the pH of the competing agent solution to maintain a pH of about 6.0 to about 6.5;
    combining a zirconium tetraalkoxide and an alkanolamine in a solvent to form a crosslinker composition, wherein the combining is carried out at a temperature between about 15 C and about 46° C. and the molar ratio of zirconium tetraalkoxide to the alkanolamine is about 1:9;
    maintaining the crosslinker composition at a temperature of from about 35° C. to about 40° C. for 90 to 150 minutes; and
    adding the crosslinker composition to the competing agent solution.

8. The method of claim 7, wherein about 30 seconds to 5 minutes after combining the crosslinkable polymer and the delayed crosslinking composition in the produced water, the injectable solution reaches a viscosity of from about 100 cP to about 10,000 cP at 163° C. when measured at 100 s$^{-1}$.

\* \* \* \* \*